(12) United States Patent
Lu et al.

(10) Patent No.: US 11,188,804 B2
(45) Date of Patent: Nov. 30, 2021

(54) SMART CARD AND MANUFACTURING METHOD THEREFOR

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies, Co., Ltd., Beijing (CN)

( * ) Notice: Subject to any disclaimer, the term of this patent is extended or adjusted under 35 U.S.C. 154(b) by 144 days.

(21) Appl. No.: 15/742,057

(22) PCT Filed: Jul. 25, 2016

(86) PCT No.: PCT/CN2016/091501
§ 371 (c)(1),
(2) Date: Jan. 5, 2018

(87) PCT Pub. No.: WO2017/016456
PCT Pub. Date: Feb. 2, 2017

(65) Prior Publication Data
US 2018/0197061 A1    Jul. 12, 2018

(30) Foreign Application Priority Data

Jul. 29, 2015  (CN) .......................... 201510456793.2
Jul. 29, 2015  (CN) .......................... 201510456947.8

(51) Int. Cl.
| | | |
|---|---|---|
| *G06K 19/077* | (2006.01) | |
| *B42D 25/00* | (2014.01) | |
| *B42D 25/45* | (2014.01) | |
| *B32B 37/24* | (2006.01) | |
| *B32B 37/16* | (2006.01) | |

(52) U.S. Cl.
CPC ....... *G06K 19/07722* (2013.01); *B42D 25/00* (2014.10); *B42D 25/45* (2014.10);
(Continued)

(58) Field of Classification Search
CPC .......... G06K 19/077; G06K 19/07701; G06K 19/07703; G06K 19/07707;
(Continued)

(56) References Cited

U.S. PATENT DOCUMENTS 4,800,255 A   1/1989  Imran
5,208,450 A *  5/1993  Uenishi ............ G06K 19/07728
                                                              235/488

(Continued)

*Primary Examiner* — Thien M Le
*Assistant Examiner* — April A Taylor
(74) *Attorney, Agent, or Firm* — Hammer & Associates, P.C.

(57) ABSTRACT

A manufacturing method of a smart card. The manufacturing method comprises: respectively hollowing out a plurality of substrates to obtain a plurality of hollowed-out substrates (101); synthesizing the plurality of hollowed-out substrates to obtain a multilayer synthesized hollowed-out substrate (102); filling the synthesized hollowed-out substrate with an internal insert (103); and coating the synthesized hollowed-out substrate with adhesive to obtain the smart card (104). By adopting the technical solution that a multilayer synthesized hollowed-out substrate is obtained by synthesizing a plurality of hollowed-out substrates, and the synthesized hollowed-out substrate is filled with an internal insert, the production difficulty of the smart card with a function of human-computer interaction is reduced, and the production efficiency is increased.

17 Claims, 12 Drawing Sheets

(52) U.S. Cl.
CPC ......... *B32B 37/16* (2013.01); *B32B 2037/243* (2013.01); *B32B 2425/00* (2013.01)

(58) Field of Classification Search
CPC ......... G06K 19/07709; G06K 19/0772; G06K 19/07722; G06K 19/07745; G06K 19/07747; G06K 19/07749
See application file for complete search history.

(56) References Cited

U.S. PATENT DOCUMENTS

| | | | | |
|---|---|---|---|---|
| 6,217,685 | B1* | 4/2001 | Leydier | G06K 19/07745 156/242 |
| 6,843,422 | B2* | 1/2005 | Jones | B23C 5/10 235/380 |
| 8,708,222 | B2* | 4/2014 | Huber | G06K 19/077 235/375 |
| 2006/0054707 | A1* | 3/2006 | Akita | G06K 19/07749 235/492 |
| 2006/0226240 | A1* | 10/2006 | Singleton | G06K 19/0702 235/492 |
| 2010/0039594 | A1* | 2/2010 | Golan | G02F 1/133305 349/122 |
| 2012/0103508 | A1* | 5/2012 | Xie | G06K 19/072 156/264 |
| 2016/0110639 | A1* | 4/2016 | Finn | B23K 26/361 235/439 |

\* cited by examiner

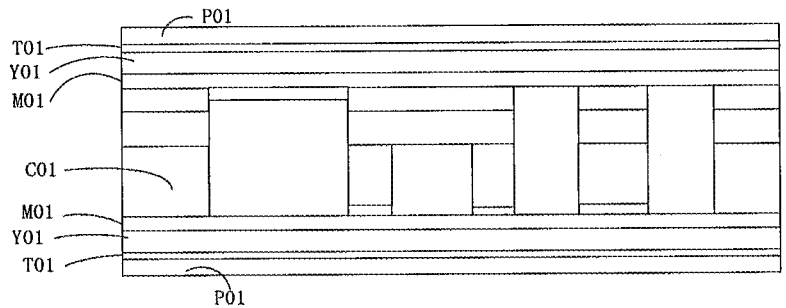

Fig. 44

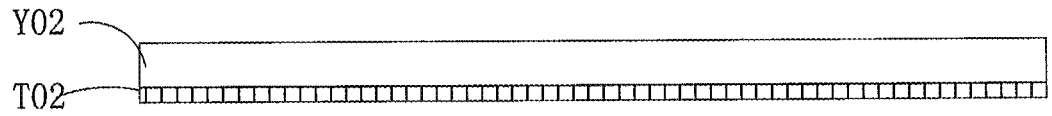

Fig. 45

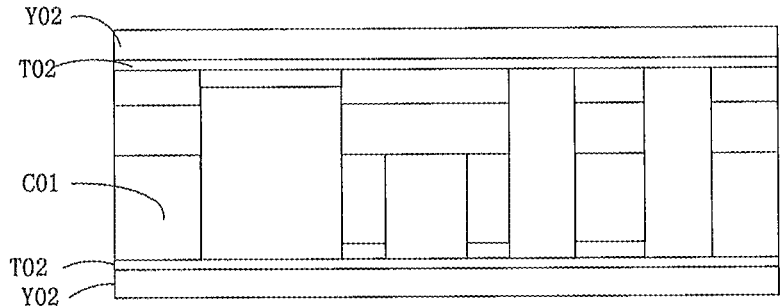

Fig. 46

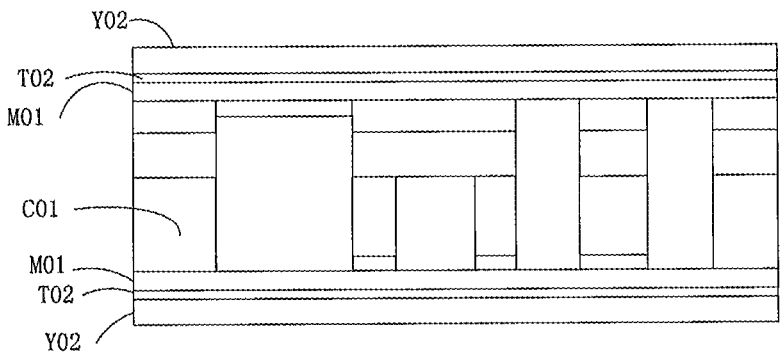

Fig. 47

2301: Hollowing out the first base plate, the second base plate and the third base plate to obtain the bottom-layered hollowed base plate, the middle-layered hollowed base plate and the top-layered hollowed base plate 2302: Synthesizing the bottom-layered hollowed base plate, the middle-layered hollowed base plate and the top-layered hollowed base plate to obtain the synthetic hollowed base plate 2303: Filling the mold insert into the synthetic hollowed base plate 2304: Coating binding agent on the synthetic hollowed base plate to obtain the smart card

Fig. 48

SMART CARD AND MANUFACTURING METHOD THEREFOR

FIELD OF THE INVENTION

The present invention relates to a smart card and a method for making the smart card, which belong to field of smart card technology.

PRIOR ART

There are two types of smart card, which are a smart card with a contact chip and a smart card with a contactless chip, respectively. At the moment, there appears a new smart card with a double-interface chip which is compatible for the two above functions. But all of these smart cards have a weak ability for human-computer interaction.

In prior art, some smart card can execute human-computer interaction, but it is difficult to manufacture and it is low effective.

SUMMARY OF THE INVENTION

The object of the present invention is to provide a smart card and a method for making the smart card, which has a function of human-computer interaction, and is easier to manufacture the smart card.

Thus, according to one aspect of the present invention, there is provided a smart card including a synthetic-hollowed-out base plate and a covering layer on the synthetic-hollowed-out base plate; there is a mold insert included in the synthetic-hollowed-out base plate; and the synthetic-hollowed-out base plate includes multiple-layer hollowed base plates.

Preferably, the multiple-layer hollowed base plates includes a three-layered-hollowed base plate, which specifically comprises: a bottom-layer hollowed base plate, a middle-layer hollowed base plate and a top-layer hollowed base plate.

Preferably, the mold insert includes an interactive circuit module.

Preferably, the mold insert further includes a non-interactive circuit module.

Preferably, the interactive circuit board includes a key module and a display module; and the non-interactive circuit module includes a power supply module and a control module.

Preferably, a height of the interactive circuit module is higher than a height of the non-interactive circuit module; at least, the interactive circuit module is located in a hollowed area of the top-layer hollowed base plate of the multiple-layer hollowed base plates; and at least, the non-interactive circuit module is located in the hollowed area of one layer of the hollowed base plate of the multiple-layer hollowed base plates.

Preferably, the non-interactive circuit module is at least located in the hollowed area of one layer of bottom-layer hollowed base plate, and middle-layer hollowed base plate and the top-layer hollowed base plate.

Preferably, the interactive circuit module includes a key module and a display module; and the non-interactive circuit module includes a power supply module and a control module;

a height of the key module and a height of the display module are higher than a height of the power supply module and a height of the control module; and the key module is located in a hollowed area of the multiple-layer hollowed base plates; the display module is located in a hollowed area of the multiple-layer hollowed base plates; the power supply module is at least located in a hollowed area of the bottom-layer hollowed base plate of the multiple-layer hollowed base plates; and the control module is at least located in a hollowed area of the bottom-layer hollowed base plate of the multiple-layer hollowed base plates.

Preferably, the key module is located in a hollowed area of the bottom-layer hollowed base plate, and a hollowed area of the middle-layer hollowed base plate and a hollowed area of the top-layer hollowed base plate; and the display module is located in a hollowed area of the bottom-layer hollowed base plate, a hollowed area of the middle-layer hollowed base plate and a hollowed area of the top-layer hollowed base plate.

Preferably, the height of the power supply module is different from the height of the control module; and the power supply module is at least located in a hollowed area of one layer of the multiple-layer hollowed base plates at a middle of the multiple-layer hollowed base plates in the case that the height of the power supply module is higher than the height of the control module.

Preferably, the power supply module is further located in a hollowed area of the base plate at least in the case that the base plates are three-layered-hollowed base and the height of the power supply module is higher than the height of the control module; or at least, the control module is further located in a hollowed area of one layer of the multiple-layer hollowed base plates at a middle of the multi-layered hollowed base plates in the case that the height of the control module is higher than the height of the power supply module.

Preferably, the control module is at least located in a hollowed area of the middle-layer hollowed base plate in the case that the multiple-layer hollowed base plate is the three-layered-hollowed base plate and the height of the control module is higher than the height of the power supply module.

Preferably, the control module comprises a circuit board and a micro-controller.

Preferably, the covering layer comprises a first printed design layer, a first printing material layer and a first printing-protected layer; the first printing material layer is located between the synthetic-hollowed base plate and the first printed design layer, and the first printed design layer is located between the first printing material layer and the first printing-protected layer.

Preferably, the covering layer further comprises a lamination; and the lamination is located between the synthetic-hollowed base plate and the first printing material layer.

Preferably, the covering layer comprises a second printed design layer and a second printing material layer; the second printed design layer is located between the second printing material layer and the synthetic-hollowed base plate; and the second printing material layer is transparent.

Preferably, the covering layer further comprises a lamination, which is located between the synthetic-hollowed base plate and the second printed design layer.

Preferably, a raw material of the covering layer is one type of PVC, PC, PETG, PET and ABS PVC resin.

According to the other aspect of the present invention, there is provided a method for making a smart card, which comprises the following steps:

s1) hollowing out each of multiple base plates to obtain multiple hollowed base plates;

s2) synthesizing the multiple hollowed base plate to obtain a synthetic-hollowed base plate;

s3) filling a mold insert in the synthetic-hollowed base plate; and s4) coating the synthetic-hollowed base plate with a binding agent to obtain a smart card.

Preferably, the multiple base plates in Step s1 can specifically be three base plates, which are a first base plate, a second base plate and a third base plate; and the three base plates are hollowed out to obtain a bottom-layer hollowed base plate, a middle-layer hollowed base plate and a top-layer hollowed base plate.

Preferably, Step s1 specifically comprises: hollowing out the multiple base plates through punching, die cutting or milling so as to obtain the multiple hollowed base plates.

Preferably, Step s1 specifically comprises hollowing out the first base plate, the second base plate and the third base plate, respectively, through punching, die cutting or milling so as to obtain the bottom-layer hollowed base plate, the middle-layer hollowed base plate and the top-layer hollowed base plate.

Preferably, Step s1 specifically comprises:

hollowing out the first base plate according to a first preset hollowed area to obtain the bottom-layer hollowed base plate, the bottom-layer hollowed base plate including a bottom-layer hollowed area;

hollowing out the second base plate according to a second preset hollowed area so as to obtain the middle-layer hollowed base plate, the middle-layer hollowed base plate including a middle-layer hollowed area; and hollowing out the third base plate according to a third preset hollowed area so as to obtain the top-layer hollowed base plate, the top-layer hollowed base plate including a top-layer hollowed area.

Preferably, Step s1 specifically comprises:

hollowing out the first base plate according to a first preset hollowed area and a first preset thickness so as to obtain the bottom-layer hollowed base plate which comprises a bottom-layer hollowed area;

hollowing out the second base plate according to a second preset hollowed area and a second preset thickness so as to obtain the middle-layer hollowed base plate which comprises a middle-layer hollowed area; and hollowing out the third base plate according to a third preset hollowed area and a third preset thickness to obtain the top-layer hollowed base plate which comprises a top-layer hollowed area.

Preferably, Step s1 specifically comprises: hollowing out multiple base plates one by one according to multiple preset hollowed areas to obtain multiple hollowed base plates.

Preferably, Step s1 specifically comprises: hollowing out multiple base plates one by one according to multiple preset hollowed areas and multiple preset thicknesses to obtain multiple hollowed base plate.

Preferably, Step s2 specifically comprises: synthesizing the multiple hollowed base plates according to size of the hollowed area of the multiple hollowed base plates via attachment technique and/or laminating technique to obtain a synthetic base plate.

Preferably, Step s2 specifically comprises synthesizing the multiple hollowed base plates via attachment technique and/or laminating technique so as to obtain the synthetic base plate which can accommodate the mold insert.

Preferably, synthesizing the multiple hollowed base plates to obtain the synthetic base plate specifically comprises synthesizing the multiple hollowed base plates all at once or for several times to obtain the synthetic base plate.

Preferably, Step s2 specifically comprises:

synthesizing the bottom-layer hollowed base plate, the middle-layer hollowed base plate and the top-layer hollowed base plate according to the size of the bottom-layer hollowed area, the size of the middle-layer hollowed area and the size of the top-layer hollowed area via the attachment technique and/or laminating technique to obtain the synthetic base plate which can accommodate the mold insert.

Preferably, Step s2 specifically comprises synthesizing the bottom-layer hollowed base plate, the middle-layer hollowed base plate and the top-layer hollowed base plate via the attachment technique and/or laminating technique so as to obtain the synthetic hollowed base plate which can accommodate the mold insert.

Preferably, synthesizing the bottom-layered base plate, the middle-layered base plate and the top-layered base plate specifically comprises synthesizing the bottom-layered base plate, the middle-layered base plate and the top-layered base plate all at once or for several times.

Preferably, Step s3 specifically comprises filling the mold insert into the hollowed base plate via the attachment technique and/or laminating technique.

Preferably, after Step s3, the method further includes filling a binding agent into an interspace between the mold insert and the synthetic hollowed base plate.

Preferably, after the synthetic base plate is coated on the binding agent, the method further includes coating the covering layer.

Preferably, the covering layer includes a first printed design layer, a first printing material layer and a first printing-protected layer; and the first printing material layer is located between the synthetic hollowed base plate and the first printed design layer, the first printed design layer is located between the first printing material layer and the first printing-protected layer.

Preferably, the covering layer further comprising a lamination; and the lamination is located between the synthetic hollowed base plate and the first printing material layer.

Preferably, the covering layer comprising a second printed design layer and a second printing material layer, and the second printing material layer is transparent; the second printed design layer is located between the second printing material layer and the synthetic hollowed base plate.

Preferably, the covering layer further including a lamination; and the lamination is located between the synthetic hollowed base plate and the second printed design layer.

Preferably, the raw material of the covering layer is at least one sort of PVC, PC, PETG, PET and ABS PVC.

Preferably, before Step s4, the method further comprising coating lamination on the top-layer hollowed base plate in the multiple-layer hollowed base plate.

Preferably, the mold insert comprises the interactive circuit board.

According to the present invention, it is easier for manufacturing the smart card with function of human-computer interaction by means of synthesizing multiple hollowed base plates so as to obtain a multiple-layer synthetic hollowed base plate, and filling a mold insert into the synthetic hollowed base plate. In this way, it makes the process more productive.

BRIEF DESCRIPTION OF ACCOMPANYING DRAWINGS

FIG. 43, FIG. 44, FIG. 46 and FIG. 47 show profile maps of the smart card according to Embodiment 5 of the present invention;

FIG. 45 shows a structural schematic view of a sort of covering layer according to Embodiment 5 of the present invention;

FIG. 48 shows a flow chart of a method for making a smart card according to Embodiment 6 of the present invention;

DETAILED DESCRIPTION OF THE INVENTION

Figure 1:
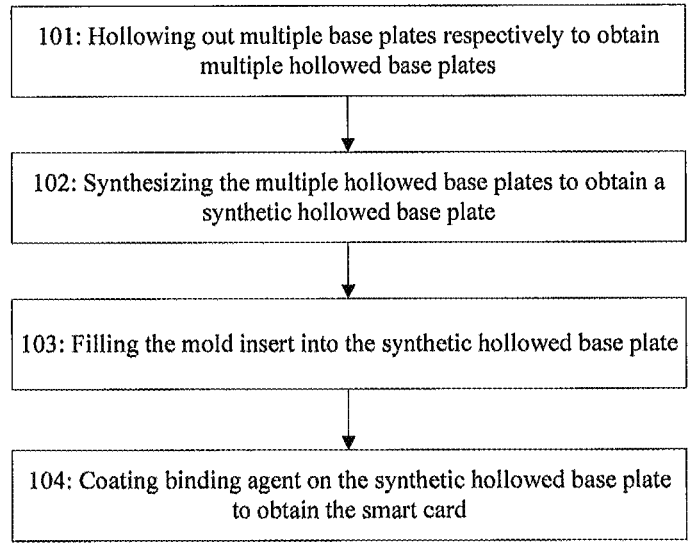
FIG. 1 shows a flow chart of a method for making a smart card according to Embodiment 1 of the present invention.

The present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of protection of the invention.

Embodiment 1

A smart card according to Embodiment 1 of the present invention, includes: a synthetic hollowed base plate and a covering layer which covers on the synthetic hollowed base plate; the synthetic hollowed base plate includes a mold insert in it; and the synthetic hollowed base plate includes multiple-layered hollowed base plate.

In Embodiment 1, the multiple-layered hollowed base plate includes multiple layers of hollowed base plates including a layer of a bottom-layer hollowed base plate, multiple layers of middle-layer hollowed base plates and a layer of a top-layered base plate, and the sum of depths of the multiple layers of the hollowed base plate is a preset total depth.

In Embodiment 1, the mold insert includes an interactive circuit module, and the interactive circuit module is a circuit module which has a function of human-computer interaction.

In Embodiment 1, the mold inset includes a non-interactive circuit module. The non-interactive circuit module is a circuit module without a function of human-computer interaction.

In Embodiment 1, the height of each circuit module can be same with each other, or be different from each other, preferably, the height of the interactive circuit module is higher than the height of the non-interactive circuit module. Correspondingly, the interactive circuit module is at least located in a hollowed area of the top-layer hollowed base plate in the multiple-layered hollowed base plate; and the non-interactive circuit module is at least located in the hollowed area of one layer of the hollowed base plate in the multiple layers of hollowed base plates. Preferably, the interactive circuit module is located in the hollowed area of the multiple-layered hollowed base plate; and the non-interactive circuit module is located in the hollowed area of the bottom-layer hollowed base plate in the multiple-layered hollowed base plate.

In Embodiment 1, the interactive circuit module includes a key module and a display module, and the non-interactive circuit module includes a power-supply module and a control module, etc.

Specifically, in the case that the height of the key module and the height of the display module are higher than the height of the power supply module and the height of the control module, the key module is located in the hollowed area of the multiple-layered hollowed base plate; the display module is located in the hollowed area of the multiple-layered hollowed base plate; the power-supply module is at least located in the hollowed area of the bottom-layer hollowed base plate in the multiple-layered hollowed base plate; and the control module is at least located in the hollowed area of the bottom-layer hollowed base plate in the multiple-layered hollowed base plate.

In the case that the height of the key module and the height of the display module are higher than the height of the power-supply module and the height of the control module and the height of the power-supply is higher than the height of the control module, the key module and the display module are located in the hollowed area of the multiple-layered hollowed base plate respectively; the power-supply module is at least located in the hollowed area of the bottom-layer hollowed base plate and the middle-layer hollowed base plate; and the control module is at least located in the hollowed area of the bottom-layer hollowed base plate.

In the case that the height of the key module and the height of the display module are higher than the height of the power-supply module and the height of the control module and the height of the control module is higher than the height of the power-supply module, the key module and the display module are located in the hollowed area of the multiple-layered hollowed base plate respectively; the control module is at least located in the hollowed area of the bottom-layer hollowed base plate and the middle-layer hollowed base plate; and the power-supply module is at least located in the hollowed area of the bottom-layer hollowed base plate.

In the case that the height of the key module and the height of the display module are higher than the height of the power-supply module and the height of the control module and the height of the power-supply module equals the height of the control module, the key module and the display module are located in the hollowed area of the multiple-layered hollowed base plate respectively; the power-supply module is at least located in the hollowed area of the bottom-layer hollowed base plate; and the control module is at least located in the hollowed area of the bottom-layer hollowed base plate in the multiple-layered hollowed base plate.

In Embodiment 1, the key module specifically includes electronic components, such as the key; the display module can specifically include electronic components, such as a screen; the power supply module specifically includes electronic components, such as a battery; the control module can specifically include electronic components, such as a circuit board and a microcontroller, in which the electronic components, which includes the display screen, the battery, the microcontroller and the keys are integrated on the circuit board.

It is noted that in the case that a height of the microcontroller is higher than a height of the circuit board, the circuit board is at least located in the hollowed area of the bottom-layer hollowed base plate, and the microcontroller is at least located in the hollowed area of one layer of the middle-layer hollowed base plates.

In Embodiment 1, it provides a covering layer on the smart card, the covering layer includes: a first printed design layer, a first printing material layer and a first printing-protected layer; the first printing material layer is located between the synthetic hollowed base plate and the first printed design layer, the first printed design layer is located between the first printing material layer and the first printing-protected layer. The covering layer can further include a lamination which is located between the synthetic hollowed base plate and the first printing material layer.

In Embodiment 1, the first printed design layer is a layer which has a pattern design on it, the first printing material layer is configured to make the pattern design printed on it, the first printing-protected layer is configured to protect the layer of the first printed design layer, in which the first printing material layer can be transparent or non-transparent, and the first printing-protected layer can be all transparent, or a part thereof which contacts with the printed design is transparent.

In Embodiment 1, it provides another covering layer, which includes: a second printed design layer and a second printing material layer; and the second printing material layer is transparent. The second printed design layer is between the second printing material layer and the synthetic hollowed base plate. The covering layer can further include a lamination which is located between the synthetic hollowed base plate and the second printed design.

In the present Embodiment 1, the second printed design layer is a layer which has a printed pattern design thereon, the second printing material is configured to make the pattern design printed thereon, and the second printing material layer can be all transparent or a part of the second printing material layer which contacts to the printed design is transparent.

In Embodiment 1, the material of the covering layer is at least one selected from the group consisting of PVC (Polyvinyl Chloride), PC (Polycarbonate), PETG (Poly ethylene terephthalateco-1,4-cyclohexylenedimethylene terephthalate), PET (poly (ethylene terephthalate)), and ABS PVC resin.

In Embodiment 1, the printed design on the second printed design layer is visible when the second printed design is watched through the second printing material layer which is transparent, the printed design on the first printed design layer is visible when the first printed design layer is watched through the first printing-protected layer. At the same time, the second printing material layer on the second printed design layer can protect the second printed design layer. In this way, comparing to the covering layer which includes the first printed design layer, the first printing material layer and the first printing-protected layer, the covering layer which includes the second printed design layer and the second printing material layer makes the smart card thinner while can realize the same function.

In Embodiment 1, slice-shaped material, which is made of synthetic resin, applies for the lamination, the material can be at least one sort of PVC, PC, PETG and ABS PVC resin.

It provides a smart card with a human-computer interaction function according to Embodiment 1, in which the smart card comprises a synthetic hollowed base plate and the covering layer coating on the base plate, the synthetic hollowed base plate comprises multiple layers of hollowed base plates, the multiple layers of the hollowed base plates includes one layer of bottom-layer hollowed base plate, multiple layers of middle-layer hollowed base plate and one layer of top-layer hollowed base plate, and a mold insert is included in the synthetic hollowed base plate, in this way, the structure of the smart card makes the mold insert more stable in the smart card, and makes the smart more resistant. The mold insert according to Embodiment 1 includes an interactive circuit module, or further includes non-interactive circuit module. According to the smart card provided in Embodiment 1, the interactive circuit module is at least located in the hollowed area of the top-layer hollowed base plate in the multiple-layered hollowed base plate, while the non-interactive circuit module is at least located in the hollowed area of one layer of the hollowed base plate in the multiple-layered hollowed base plate, such a structure makes the non-interactive circuit module safer and makes the non-interactive circuit module and the interactive circuit module more stable and more fold-resistance. In this way, the smart card can be used longer.

A method for making a smart card according to Embodiment 1, as shown in FIG. 1, comprises:

Step 101, multiple of base plates are hollowed out to obtain multiple of hollowed base plates.

Preferably, it provides multiple base plates according to the present invention, and the base plates uses slice-shapes material made of synthetic resin, and the material can be at least one sort of PVC, PC, PETG, PET and ABS PVC resin. The multiple of hollowed base plates comprises at least four hollowed base plates.

In Embodiment 1, hollowing out the multiple of base plates to obtain multiple of hollowed base plates specifically includes hollowing out the multiple of base plates by means of punching, die cutting or milling to obtain multiple of base plates.

In Embodiment 1, hollowing out the multiple of base plates to obtain multiple of hollowed base plate specifically includes hollowing out the multiple of base plates respectively according to multiple of preset hollowed areas to obtain multiple of hollowed base plates.

In Embodiment 1, hollowing out multiple of base plates respectively to obtain multiple of hollowed base plates can further include hollowing out multiple of base plates respectively according to multiple of preset hollowed areas and multiple of preset thicknesses to obtain multiple of hollowed base plates.

It is noted that the location of multiple of preset hollowed areas can be determined according to the mold insert, specifically, the multiple of preset hollowed areas are determined according to the location and the height of the interactive circuit module and the non-interactive circuit module. Multiple of preset thicknesses corresponding to the multiple of preset hollowed areas are determined according to the mold insert, specifically, the multiple of preset thicknesses corresponding to the multiple of preset hollowed areas are determined according to the location and the height of the interactive circuit module and the non-interactive circuit module of the mold insert. In the present Embodiment, the sum of the thicknesses of the multiple of hollowed base plates at least equals the height of the mold insert, and the sum of the thicknesses of the multiple of hollowed base plates is a preset total thickness.

Step 102, the multiple of hollowed base plates are synthesized to obtain the synthetic hollowed base plate.

Specifically, multiple of hollowed base plates are synthesized to obtain the synthetic hollowed base plate which includes a mold insert in it.

In Embodiment 1, it can, but not limited to, take advantages of adhering and/or laminating to synthesize the multiple of hollowed base plates so as to obtain the synthetic hollowed base plate which include the mold insert in it.

It is noted that the multiple of hollowed base plates can be synthesized for one time or for several times (at least for two times) in Embodiment 1 so as to obtain the synthetic hollowed base plate which includes the mold insert in it.

Step 103, the mold insert is filled into the synthetic hollowed base plate;

in Embodiment 1, it can, but not limited to, take advantages of adhering and/or laminating to synthesize the synthetic hollowed base plate and the mold insert so as to obtain the synthetic hollowed base plate which include the mold insert in it.

Step 104, the synthetic hollowed base plate is coated with binding agent to obtain the smart card;

the binding agent can be coated in a strip-shape evenly and with an equal interval on the surface of the synthetic hollowed base plate which includes the mold insert in it; and the coated binding agent is smoothed by means of a roller.

It is noted that it can fill binding agent into the gap between the base plate which includes the mold insert and the synthetic hollowed base plate after Step 103 to make the mold insert fit closely with the synthetic hollowed base plate.

In Embodiment 1, after the synthetic hollowed base plate is coated on the binding agent, the method further includes: coating a covering layer on the synthetic hollowed base plate.

In Embodiment 1, the covering layer on the surface of the synthetic hollowed base plate which includes a mold insert uses a slice-shaped material made of synthetic resin, and the raw material of the synthetic resin can be made of at least one sort of PVC, PC, PETG, PET and ABS PVC resin.

In Embodiment 1, it provides the covering layer of the smart card, which includes the first printed design layer, the first printing material layer and the first printing-protected layer; the first printing material layer is located between the synthetic hollowed base plate and the first printed design layer, the first printed design layer is located between the first printing material layer and the first printing-protected layer. The covering layer further includes lamination which is located between the synthetic hollowed base plate and the first printing material layer.

In Embodiment 1, the first printed design layer is a layer which includes a printed pattern design, the first printing material layer is configured to a material layer which has the printed pattern design printed on it, and the first printing-protected layer is configured to protect the first printed design layer, the first printing material can be transparent or nontransparent, the first printing-protected layer can be all-transparent, or a part thereof which connects to the printed design in the first printed design layer is transparent.

In Embodiment 1, there is also provided another covering layer, which comprises the second printed design layer and the second printing material layer, the second printing material is transparent; the second printed design layer is located between the second printing material layer and the synthetic hollowed base plate; and the covering layer further comprises the lamination film, the lamination film is located between the synthetic hollowed base plate and the second printed design layer.

In Embodiment 1, the second printed design layer is a layer with a printed pattern: the second printing material layer is a material layer for printing the pattern thereon; and the second printing material can be fully transparent, or only a portion for contacting the printed pattern of the second printed design layer is transparent.

It is noted that an upper surface and a lower surface of the synthetic hollowed base plate can be coated with the covering layer which includes the first printed design layer, the first printing material layer and the first printing-protected layer or the covering layer which includes the second printed design layer, the second printing material layer and the second printing-protected layer respectively, or both of the upper surface and the lower surface of the synthetic hollowed base plate are coated with the covering layers which include the first printed design layer, the first printing material layer and the first printing-protected layer; or both of the upper surface and the lower surface of the synthetic hollowed base plate are coated with covering layers which include the second printed design layer and the second printing material layer. Correspondingly, the upper surface and/or the lower surface of the synthetic hollowed base plate can be coated with the lamination in the case that the covering layer further includes the lamination, which is located between the first printing material layer and the synthetic hollowed base plate or is located between the second printed design layer and the synthetic hollowed base plate.

It is noted that the lamination needs a roller to make the lamination contact with the synthetic hollowed base plate which includes the mold insert gradually in the case that the covering layer further includes the lamination, thus, it avoids the bubble during the lamination. The lamination can be all-transparent, can also be the area which corresponds to the interactive circuit module of the mold insert transparent, which can make the card holder key board enter and/or check the information displayed on the card.

In Embodiment 1, the printed design is printed on the second printing material layer through the reprint printing technology so as to obtain the covering layer which includes the second printed design layer and the second printing material layer.

In Embodiment 1, before Step 104, the method further includes: coating lamination on the top-layer hollowed base plate of the multiple-layered hollowed base plate.

It can combine multiple sorts of active and/or positive electronic components in the production process of the present invention, which include a smart card chip, RFID chip and antenna, fingerprint-identification sensor, resistance-capacitance (RC), crystal oscillator and chip, etc.

In Embodiment 1, in the method according to the present invention, multiple of base plates are hollowed out to obtain multiple of hollowed base plates, the multiple of hollowed base plates can be one bottom hollow base plate, a plurality of middle hollow base plates, and one top hollow base plate; the multiple of hollowed base plates are combined together to form a combined hollow base plate; then an insert is filled into the combined hollow base plate, thus it becomes easier to make the smart card with a more productive process to manufacture the smart card. In such an Embodiment 1 that the insert comprises an interactive circuit module and a non-interactive circuit module, in the method according to the present invention, the multiple of base plates are hollowed out to obtain multiple of hollowed base plates according to different heights of the interactive circuit module and the non-interactive circuit module, the multiple of hollowed base plates are combined together to form a multi-layer combined hollow base plate, so as to make the interactive circuit module at least locate in a hollowed area of the top-layer hollowed base plate in the multiple layers of hollowed base plates, and make the non-interactive circuit module at least locate in a hollowed area of one layer of hollowed base plate in the multiple layers of hollowed base plates, thus the process for making the smart card becomes operative, easier and effective.

Embodiment 2

Figure 2:
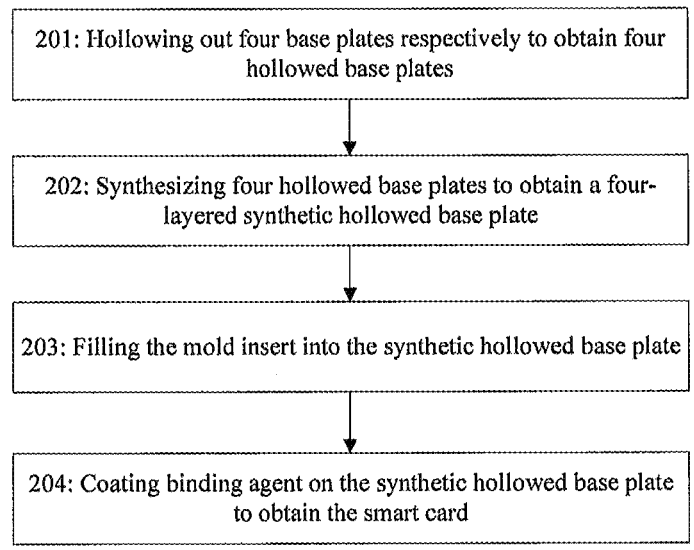
FIG. 2 shows a flow chart of a method for making a smart card according to Embodiment 2 of the present invention.

A method for making a smart card, as shown in FIG. 2, specifically includes:

Step 201, four base plates are hollowed out respectively to obtain four hollowed base plates.

Figure 3:
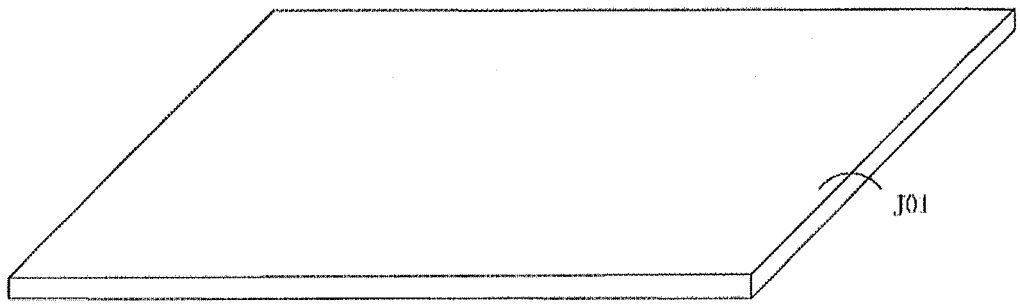
FIGS. 3-6 show schematic views of the base plate according to Embodiment 2 of the present invention.
Figure 4:
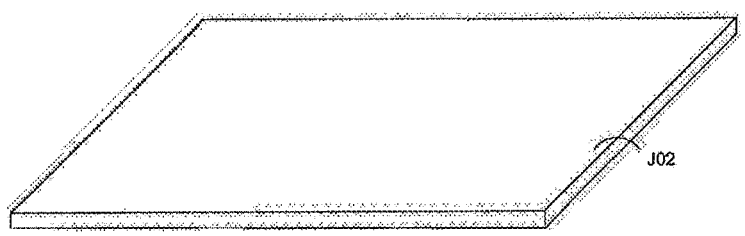
Figure 5:
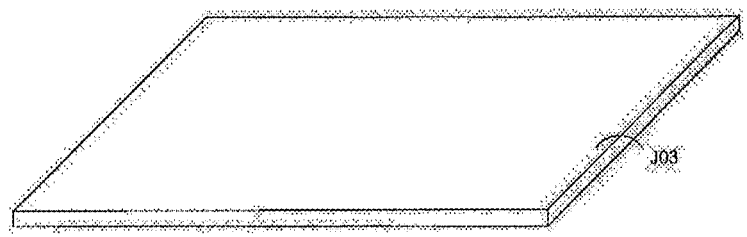
Figure 6:
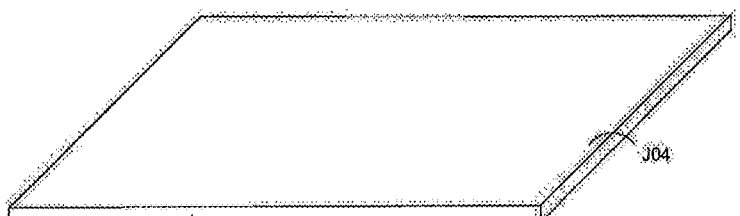

In Embodiment 2, preferably, the four base plates are a first base plate J01, a second base plate J02, a third base plate J03 and a fourth base plate J04 respectively, in which the first base plate J01 is shown as FIG. 3; the second base plate J02 is shown as FIG. 4; the third base plate J03 is shown in FIG. 5; and the fourth base plate J04 is shown in FIG. 6.

Step 201 specifically includes:

hollowing out the first base plate J01 by means of punching, die cutting and milling according to the bottom-layered preset hollowed area and the bottom-layered preset thickness so as to obtain the bottom-layer hollowed base plate L01.

Figure 7:
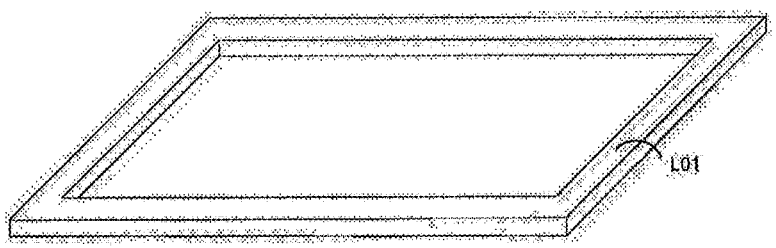
FIGS. 7-10 show schematic views of the hollowed base plate according to Embodiment 2 of the present invention.

In Embodiment 2, the bottom-layered base plate L01 can be shown in FIG. 7.

The second base plate J02 is hollowed out by means of punching, die cutting or milling according to the first preset hollowed area in the middle and the first preset thickness in the middle so as to obtain the first hollowed base plate L02 in the middle.

Figure 8:
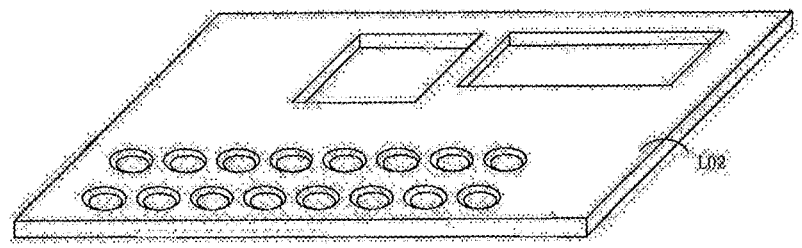

In Embodiment 2, the first hollowed base plate L02 in the middle is shown in FIG. 8.

The third base plate J03 is hollowed out by means of punching, die cutting or milling according to the second preset hollowed area in the middle and the second preset thickness in the middle to obtain the second hollowed base plate L03 in the middle.

Figure 9:
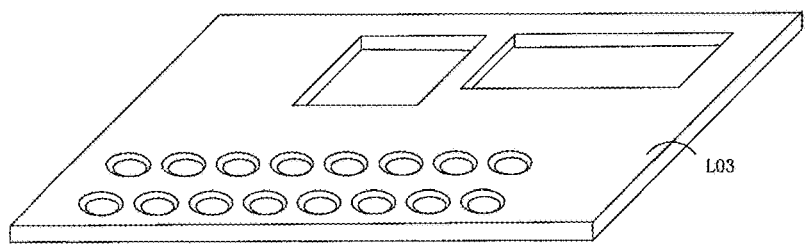

In Embodiment 2, the second hollowed base plate L03 in the middle is shown in FIG. 9.

The fourth base plate J04 is hollowed out by means of punching, die cutting or milling according to top-layered preset hollowed area and the top-layered preset thickness so as to obtain the top-layer hollowed base plate L04.

Figure 10:
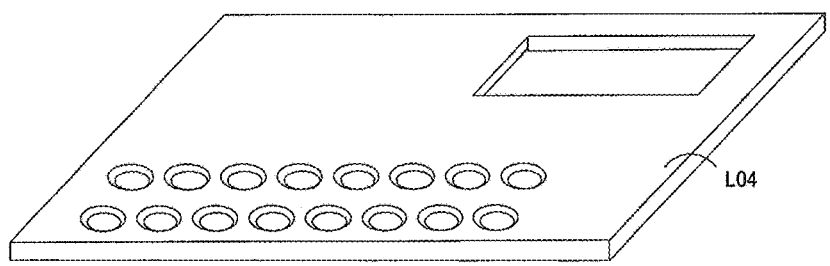

In Embodiment 2, the top-layer hollowed base plate L04 can be shown in FIG. 10.

It is noted that the preset hollowed area and the preset thickness are determined according to the location and height-difference of each circuit module of the mold insert in Embodiment 2.

Figure 11:
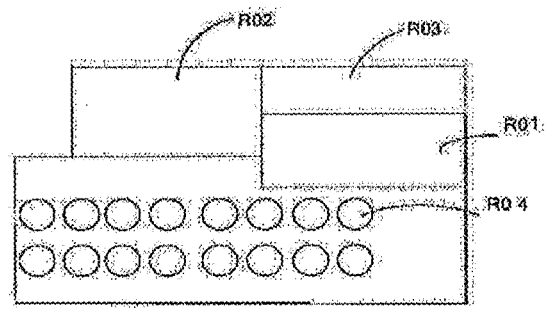
FIG. 11 shows a plane schematic view of the mold insert according to the Embodiment 2 of the present invention.

In Embodiment 2, it provides a plane structural schematic of a mold insert, as shown in FIG. 11, the mold insert includes a control module R01, a power supply module R02, a display module R03 and a key module R04.

In Embodiment 2, the control module R01 can specifically include electronic components, such as a circuit board and a microcontroller, in which the microcontroller and the key module R04 are integrated on the circuit board.

Figure 12:
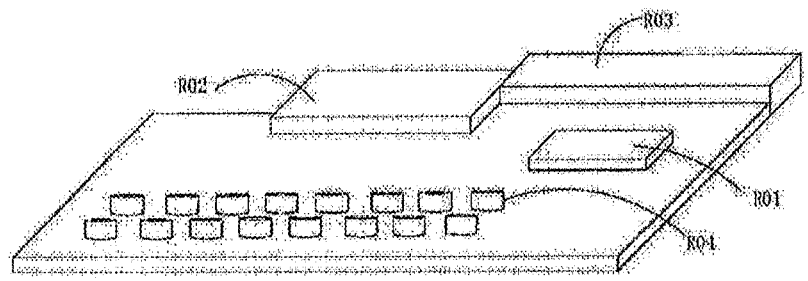
FIG. 12 shows a structural schematic view of the mold insert according to Embodiment 2 of the present invention.

In Embodiment 2, the stereoscopic structural schematic of the mold insert as shown in FIG. 12 includes the control module R01, the power supply module R02, the display module R03 and the key module R04, etc., in which the control module R01 specifically includes electronic components, such as the circuit board and the microcontroller, in which the microcontroller and the key module R04 are integrated on the circuit board; in which the height of the control module R01 is h01, the height of the power supply R02 is h02, the height of the display module R03 is h03, and the height of the key module R04 is h04.

In Embodiment 2, preferably, h04>h03>h02>01, in which the display module R03 and the key module R04 are the circuit modules which have the human-computer interactive function; and the control module R01 and the power supply module R02 are the circuit modules which do not have the human-computer interactive function.

In Embodiment 2, the base plate J01 is hollowed by means of punching, die cutting or milling according to the bottom-layered preset hollowed area and the bottom-layered preset thickness to obtain the bottom-layer hollowed base plate L01 whose hollowed area can at least include all of the circuit module in the mold insert, that means the hollowed area of the bottom-layered base plate L01 can at least be filled with the control module R01, the power supply module R02, the display module R03 and the key module R04; the thickness of the bottom-layer hollowed base plate L01 is at least equivalent to a height of the highest circuit module which cannot be filled in the first hollowed base plate L02 in the middle, in Embodiment 2, the thickness of the bottom-layer hollowed base plate L01 is at least equivalent to the height h01 of the control module R01.

The hollowed area of the first hollowed base plate L02 at the middle and the hollowed area of the second hollowed base plate L03 at the middle can at least be filled with the circuit module which has the human-computer function and the circuit module whose height is higher than the bottom-layered preset thickness and which cannot be filled in the top-layer hollowed base plate L04, the hollowed area of the first hollowed base plate L02 at the middle and the hollowed area of the second hollowed base plate L03 at the middle can at least be filled with the display module R03, the key module R04 and the power supply module R02.

The sum of the thickness of the first hollowed base plate L02 at the middle and the thickness of the second hollowed base plate L03 at the middle is at least equivalent to the difference between the height of the circuit module which cannot be filled into the top-layer hollowed base plate L04 and the height of highest circuit module which cannot be filled into the first hollowed base plate L02 at the middle and the second hollowed base plate L03 at the middle, that means the sum of the thickness of the first hollowed base plate L02 at the middle and the thickness of the second hollowed base plate L03 at the middle is at least equivalent to the difference between the height h02 of the power supply module R02 and the height of the control module R01 (h02-h01).

The fourth base plate J04 is hollowed out by means of punching, die cutting or milling according to the top-layered preset hollowed area and the top-layered preset thickness to obtain the top-layer hollowed base plate L04, and the hollowed area of the top-layer hollowed base plate L04 can at least be filled with the interactive circuit module with the human-computer function, that means the hollowed area of the top-layer hollowed base plate L04 can at least be filled with the display module R03 and the key module R04; and the thickness of the top-layer hollowed base plate L04 is at least equivalent to the difference between the height of the highest circuit module which can be filled into the top-layer hollowed base plate L04 and the height of the highest circuit module which cannot be filled into the top-layer hollowed base plate, in Embodiment 2, the thickness of the top-layer hollowed base plate L04 is at least equivalent to the difference between the height h04 of the key module R04 and the height h02 of the power supply module R02 (h04-h02).

It is noted that the hollowed area of the first hollowed base plate L02 at the middle and the hollowed area of the second hollowed base plate L03 can be the same as each other or can be different from each other in Embodiment 2.

It is noted that the sum of the thickness of the bottom-layer hollowed base plate L01, the thickness of the first hollowed base plate L02 at the middle, the thickness of the second hollowed base plate L03 at the middle and the thickness of the top-layer hollowed base plate L04 is the preset total thickness.

Step 202, the four hollowed base plates are synthesized so as to obtain a four-layered synthetic hollowed base plate.

Figure 13:
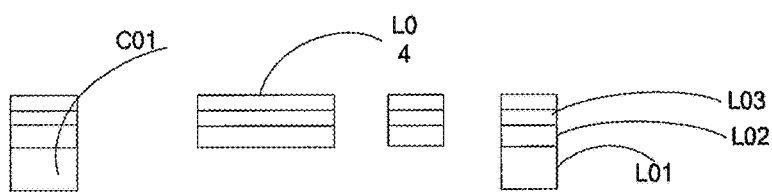
FIG. 13 shows a profile map of the synthetic hollowed base plate according to Embodiment 2 of the present invention.

In Embodiment 2, the four layers of hollowed base plates are synthesized by means of, but not limit to, adhering and/or laminating to obtain a synthetic hollowed base plate C01 which includes the mold insert. Preferably, four hollowed base plates are synthesized according to the size of the hollowed area of the four hollowed base plates to obtain the synthetic hollowed base plate C01 which includes the mold insert. In Embodiment 2, a profile of the synthetic hollowed base plate C01 is provided, which can be shown but not limit in FIG. 13.

It is noted that the four hollowed base plates are synthesized for one time or multiple of times (at least for two times) so as to obtain the synthetic hollowed base plate C01 which includes the mold insert.

For instance, the bottom-layer hollowed base plate L01, which can filled with all of the circuit modules is put at the bottom according to the hollowed area of the four hollowed base plates, the first hollowed base plate L02 at the middle is put on the top of the bottom-layer hollowed base plate L01, the second hollowed base plate L03 at the middle is put on the top of the first hollowed base plate L02, and the top-layer hollowed base plate L04 is put at the top layer, the four hollowed base plate are synthesized for one time to obtain the synthetic hollowed base plate C01 which includes the mold insert by means of screen-printing glue adhering and/or laminating; or the bottom-layer hollowed base plate L01 is put at the bottom layer, the first hollowed base plate L02 at the middle is put at the top layer according to the hollowed areas of the four hollowed base plates, and the bottom-layer hollowed base plate L01 and the first hollowed base plate L02 are synthesized to obtain the bottom-layered synthetic hollowed base plate by means of screen-printing glue adhering and/or laminating; the bottom-layered synthetic hollowed base plate is put at the bottom layer, the second hollowed base plate L03 at the middle is put at the top layer, the second hollowed base plate L03 at the middle and the bottom-layered synthetic hollowed base plate are synthesized by means of the screen-printing glue adhering and/or laminating to obtain the middle synthetic hollowed base plate; the middle synthetic hollowed base plate is put at the bottom layer, the top-layer hollowed base plate L04 is put at the top layer, the synthetic top-layer hollowed base plate L04 and the middle synthetic hollowed base plate are synthesized by means of screen-printing glue adhering and/or laminating to obtain the synthetic hollowed base plate C01 which includes the mold insert; and in Embodiment 2, there are still other methods for synthesizing four hollowed base plates so as to obtain a four-layered synthetic hollowed base plate, we will not give the details herein.

Step 203, the mold insert is filled into the synthetic hollowed base plate; and the mold insert is filled into the synthetic hollowed base plate C01 by means of, but not limit to, adhering and/or laminating in Embodiment 2 to obtain the synthetic hollowed base plate C01 which includes the mold insert.

Step 204, the synthetic hollowed base plate is coated on binding agent to obtain a smart card;

the binding agent can be coated in a strip-shape evenly and with an equal interval on the surface of the synthetic hollowed base plate which includes the mold insert in it; and the coated binding agent is smoothed by means of a roller.

Figure 14:
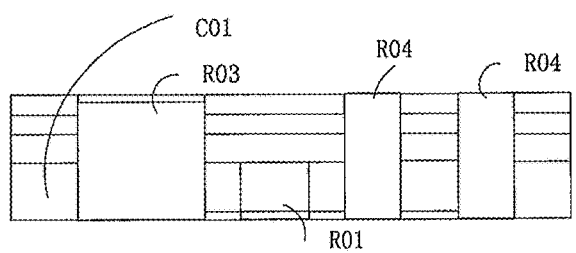
FIG. 14 shows a profile map of the synthetic hollowed base plate which includes a mold insert according to Embodiment 2 of the present invention.

In Embodiment 2, it provides a profile of the synthetic hollowed base plate C01 which include the mold insert, which can but not limit in FIG. 14.

It is noted that binding agent can be filled into the gap between the mold insert and the synthetic hollowed base plate C01 after Step 203 to make the mold insert adhere to the synthetic hollowed base plate C01.

In Embodiment 2, after the synthetic hollowed base plate is coated on binding agent, the method further includes coating a covering layer on the synthetic hollowed base plate.

In Embodiment 2, slice-shaped material which is made of synthetic resin is suitable for the covering layer on the synthetic hollowed base plate which includes the mold insert, the material can be at least one sort of PVC, PC, PETG, PET and ABS PVC resin.

In Embodiment 2, it provides a covering layer of a smart card, and the covering layer includes a first printed design layer, a first printing material layer and a first printing-protected layer; the first printing material layer is located between the synthetic hollowed base plate and the first printed design layer, the first printed design layer is located between the first printing material layer and the first printing-protected layer. The covering layer can further include a lamination, which is located between the synthetic hollowed base plate and the first printing material layer.

Figure 15:
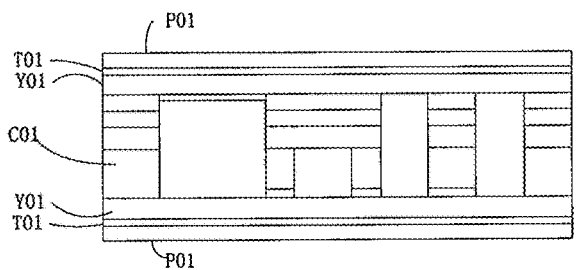
FIG. 15, FIG. 16, FIG. 18 and FIG. 19 show the profile maps of the smart card according to Embodiment 2 of the present invention.

A profile of an obtained smart card can be shown in FIG. 15 in the case that the covering layer specifically includes the first printed design layer, the first printing material layer and the first printing-protected layer, the first printing material layer Y01 is between the synthetic hollowed base plate C01 and the first printed design layer T01, and the first printed design layer T01 is between the first printing material Y01 and the first printing-protected layer P01.

Figure 16:
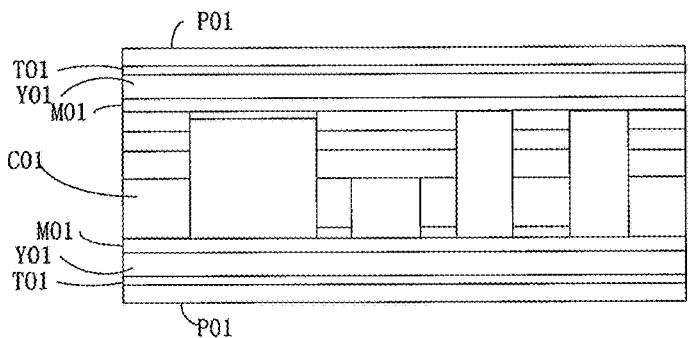

The profile of the obtained smart card can be shown in FIG. 16 in the case that the covering layer specifically includes a lamination, the first printed design layer, the first printing material and the first printing-protected layer, the lamination M01 is located between the synthetic hollowed base plate C01 and the first printing material layer Y01, the first printing material layer Y01 is located between the lamination M01 and the first printed design layer T01, and the first printed design layer T01 is located between the first printing material layer Y01 and the first printing-protected layer P01.

Figure 17:
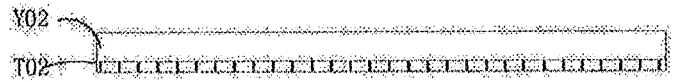
FIG. 17 shows a structural schematic view of the covering layer according to Embodiment 2 of the present invention.

In Embodiment 2, it provides another covering layer as shown in FIG. 17, which includes a second printed design layer T02 and a second printing material layer Y02, and the printing material layer Y02 is transparent. A slice-shaped material made of synthetic resin is suitable for the second printing material Y02, and the material can be at least one sort of PVC, PC, PETG, PET and ABS PVC resin.

Figure 18:
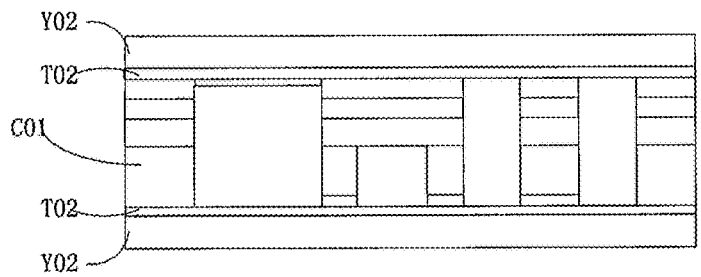

The profile of the obtained smart card can be shown in FIG. 18 in the case that the covering layer specifically includes the second printed design layer and the second printing material layer, and the second printed design layer T02 is located between the second printing material layer Y02 and the synthetic hollowed base plate C01.

Figure 19:
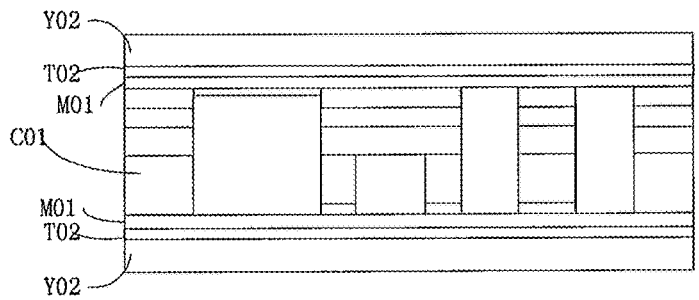

The profile of the obtained smart card is shown in FIG. 19 in the case that the covering layer specifically includes the lamination, the second printed design layer and the second printing material layer, the lamination M01 is located between the synthetic hollowed base plate C01 and the second printed design layer T02, and the second printed design layer T02 is located between the second printing material layer Y02 and the lamination M01.

A roller is used during the process of coating the lamination in the case that the covering layer includes the lamination to make sure that the lamination can contact the base plate which includes a mold insert gradually to avoid from producing bubbles when the lamination is coated.

In Embodiment 2, the lamination coated on the surface of the synthetic hollowed base plate C01 which includes the mold insert is plastic film. In Embodiment 2, the slice-shaped material made of the synthetic resin applies to the lamination, and the material can be at least one sort of PVC, PC, PETG, PET and ABS PVC resin. The lamination can be all transparent or the area of the lamination which corresponds to the display module R03 and the key module R04 are transparent to make sure the card holder can enter keys and check displayed information.

In Embodiment 2, the first printed design layer is a layer which has a pattern design on it, the first printing material layer is configured to have the pattern design printed thereon, the first printing-protected layer is configured to protect the first printed design layer, the first printing material layer can be transparent or non-transparent, and the first printing-protect layer can be all transparent, or a part thereof which contacts with the printed design is transparent.

In Embodiment 2, the second printed design layer is a layer which has a printed pattern design on it, the second printing material layer is configured to have the pattern design printed thereon, the second printing material layer can be all transparent or a part thereof which contacts with the printed design of the second printed design layer is transparent.

In Embodiment 2, the printed pattern design is printed on the second printing material layer through the reprint printing technology so as to obtain the covering layer which includes the second printed design layer and the second printing material layer.

In Embodiment 2, before Step 204, the method further includes: coating lamination on the top-layer hollowed base plate.

The production process of the present invention can be combined with multiple sorts of electronic component which is with a power supply or without a power supply, and includes a smart card chip, a RFID chip and antenna, a fingerprint-identified sensor, a resistance-capacitance, a crystal oscillator and chip, etc.

Embodiment 3

Figure 20:
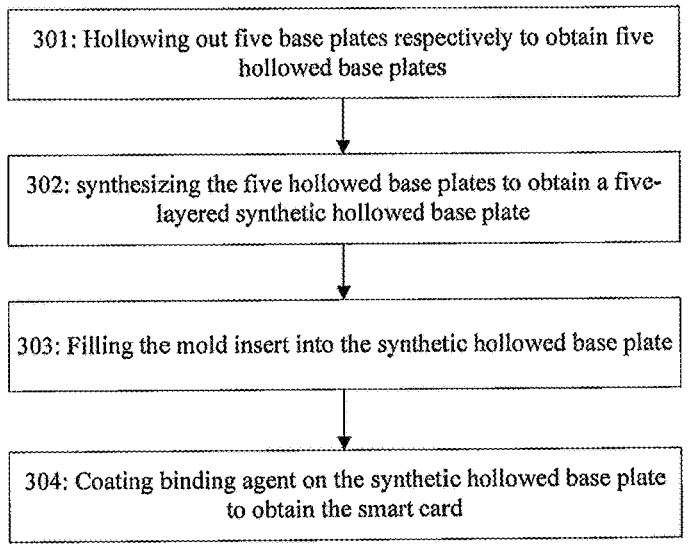
FIG. 20 shows a flow chart of a method for making a smart card according to Embodiment 3 of the present invention.

A method for making a smart card according to Embodiment 3 of the present invention, as shown in FIG. 20, includes:

Step 301, five base plates are hollowed out respectively to obtain five hollowed base plates.

Figure 21:
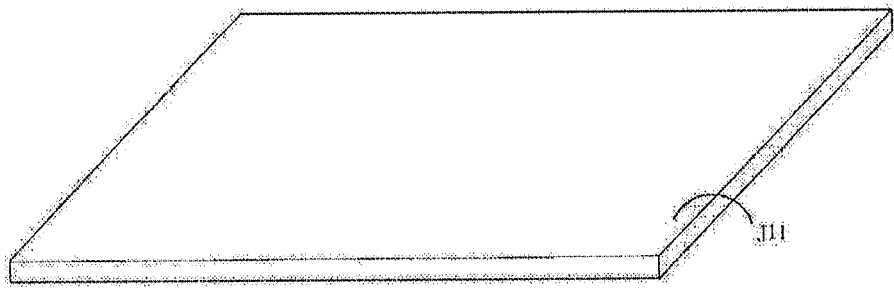
FIG. 21 shows a schematic view of the base plate according to Embodiment 3 of the present invention.

In Embodiment 3, the five base plates area first base plate J11, a second base plate J12, a third base plate J13, a fourth base plate J14 and a fifth base plate J15, in which the first base plate J11 is shown in FIG. 21; the shapes of the second base plate J12, the third base plate J13, the fourth base plate J14 and the fifth base plate J15 are the same as the shape of the first base plate J11.

Figure 22:
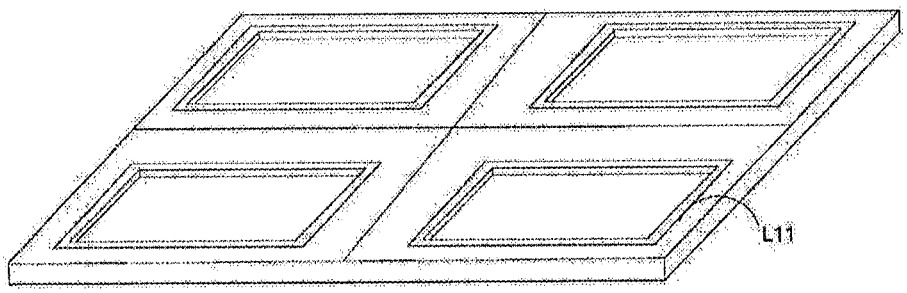
FIGS. 22-26 show schematic views of the hollowed base plates according to Embodiment 3 of the present invention.

Step 301 specifically includes:

the first base plate J00 is hollowed out by means of punching, die cutting or milling according to the bottom-layered preset hollowed area and the bottom-layered preset thickness to obtain a bottom-layer hollowed base plate L11, and in Embodiment 3, the bottom-layer hollowed base plate L11 can be shown in FIG. 22.

The second base plate J12 is hollowed out by means of punching, die cutting or milling according to the first preset hollowed area at the middle and the first preset thickness at the middle to obtain the first hollowed base plate L12 at the middle.

Figure 23:
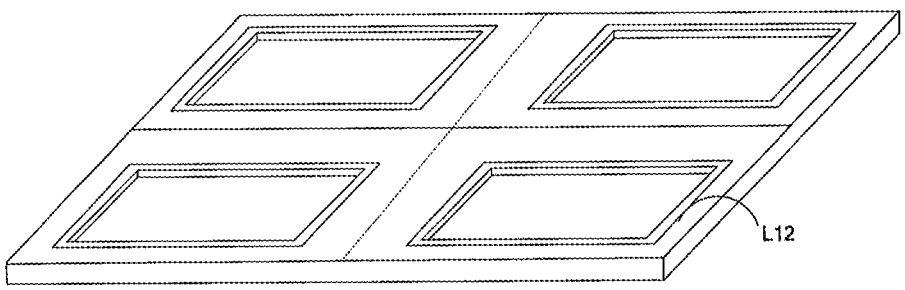
Figure 24:
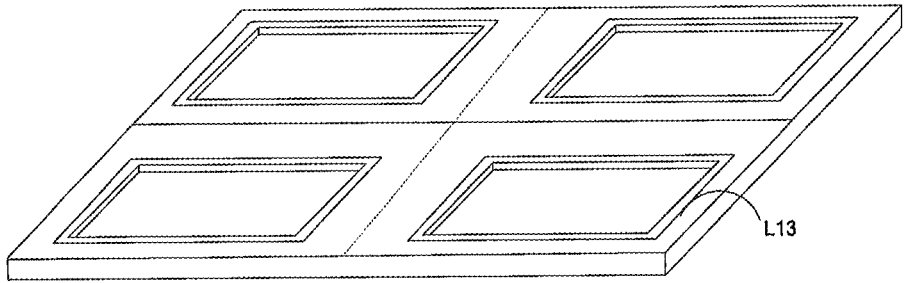

In Embodiment 3, the first hollowed base L12 at the middle is shown in FIG. 23.

The third base plate J13 is hollowed out by means of punching, die cutting or milling according to the third preset hollowed area at the middle and the third preset thickness at the middle to obtain the third hollowed base plate L14 at the middle.

Figure 25:
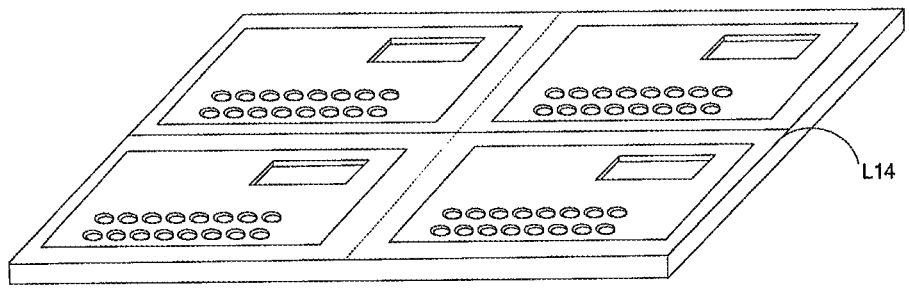

In Embodiment 3, the third hollowed base plate L14 at the middle can be shown in FIG. 25.

The fifth base plate J15 is hollowed out by means of punching, die cutting or milling according to the top-layered preset hollowed area or the top-layered preset thickness to obtain the top-layer hollowed base plate L15.

Figure 26:
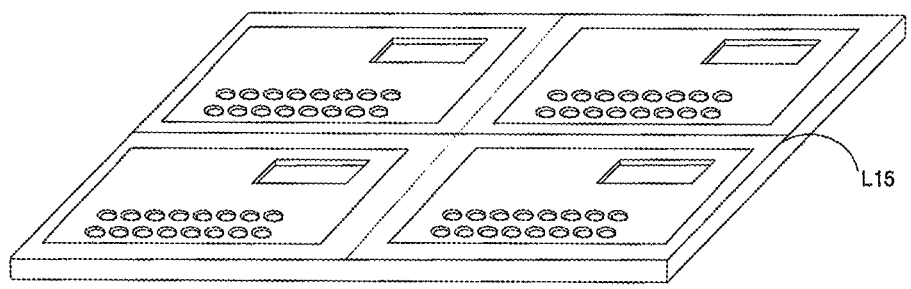

In Embodiment 3, the top-layer hollowed base plate L15 can be shown in FIG. 26.

It is noted that the preset hollowed area and the preset thickness are determined according to the locations of and the difference between the heights of every of circuit boards of the mold insert in Embodiment 3.

Figure 27:
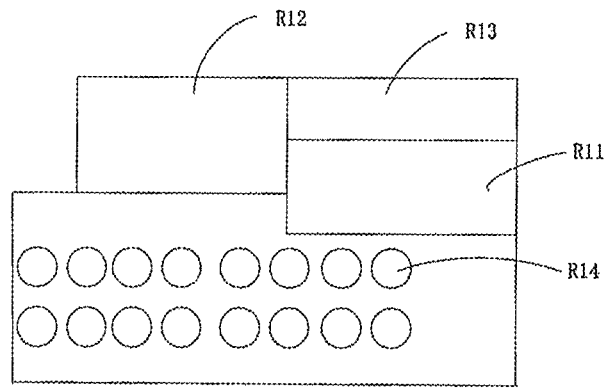
FIG. 27 shows a plane schematic view of the mold insert according to Embodiment 3 of the present invention.

In Embodiment 3, it provides a flat structural schematic diagram, as shown in FIG. 27, the mold insert includes circuit modules, such as the control module R11, the power supply module R12, the display module R13 and the key module R14.

In Embodiment 3, the control module R11 can specifically include electronic components, such as a circuit board and a microcontroller, in which the microcontroller and the key module R14 are integrated on the circuit board.

Figure 28:
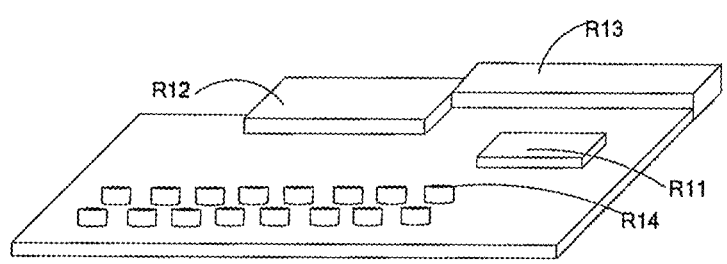
FIG. 28 shows a structural schematic view of the mold insert according to Embodiment 3 of the present invention.

In Embodiment 3, the stereoscopic structural schematic diagram of the mold insert is shown in FIG. 28, the mold insert includes circuit modules, such as the control module R11, the power supply module R12, the display module R13 and the key module R14, in which the control module R11 can specifically include the circuit board and the microcontroller, etc., in which the microcontroller and the key module R14 are integrated on the circuit board, in which the height of the control module R11 is h11, the height of the power supply module is h12, the height of the display module R13 is h13, the height of the key module R14 is h14.

In Embodiment 3, preferably, h14>h13>h12=h11, in which the display module R13 and the key module R14 are interactive circuit modules with human-computer interactive function; and the control module R11 and the power supply module R12 are non-interactive circuit module without human-computer interactive function.

In Embodiment 3, the hollowed area of the bottom-layer hollowed base plate L11, the hollowed area of the first hollowed base plate L12 at the middle and the hollowed area of the second hollowed base plate L13 at the middle can respectively at least be filled with the control module R11, the power supply module R12, the display module and the key module R14, the sum of the bottom-layer hollowed base plate L11, the first hollowed base plate at the middle L12 and the second hollowed base plate L13 at the middle is at least equivalent to the height of the control module R11, h11, or the height of the power supply module R12, h12.

The hollowed area of the third hollowed base plate L14 at the middle and the hollowed area of the top-layer hollowed base plate L15 can respectively at least be filled with the display module R13 and the key module R14.

The sum of the thickness of the third hollowed base plate L14 at the middle and the thickness of the top-layer hollowed base plate L15 is at least equivalent to the difference between the height h14 of the key module R14 and the height h12 of the power supply module R12 (h14-h12) or the difference between the height h14 of the key module and the height h11 of the control module R11 (h14-h12).

It is noted that the hollowed area of the bottom-layer hollowed base plate L11, the hollowed area of the first hollowed base plate L12 at the middle and the second hollowed base plate L13 at the middle can be the same as each other or be different from each other.

The hollowed area of the third hollowed base plate L14 at the middle and the hollowed area of the top-layer hollowed base plate L15 can be the same as each other or be different from each other.

It is noted that the sum of the thicknesses of the bottom-layer hollowed base plate L11, the first hollowed base plate L12 at the middle, the second hollowed base plate L13 at the middle, the third hollowed base plate L14 at the middle and the top-layer hollowed base plate L15 is the preset total thickness.

Step 302, the five hollowed base plates are synthesized to obtain a five-layered synthetic hollowed base plate.

Figure 29:
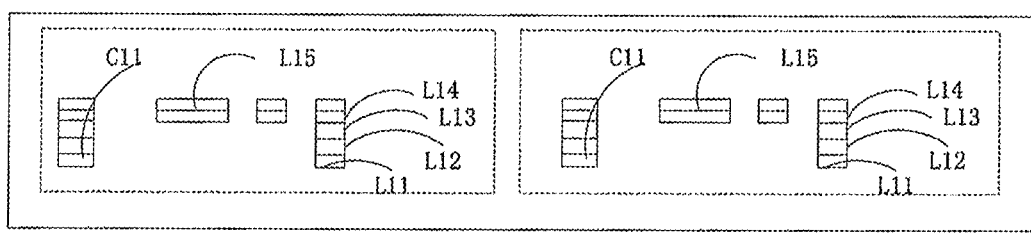
FIG. 29 shows a profile map of the synthetic hollowed base plate according to Embodiment 3 of the present invention.

In Embodiment 3, it can, but not limit to, take advantages of adhering and/or laminating technology to synthesize the five hollowed base plates to obtain a synthetic hollowed base plate C11 which includes a mold insert. Preferably, the five hollowed base plates are synthesized according to the sizes of the hollowed areas of the five hollowed base plates to obtain the synthetic hollowed base plate C11 which includes the mold insert. In Embodiment 3, it provides a profile of the synthetic hollowed base plate C11, which can but not limit as in FIG. 29.

It is noted that the five hollowed base plates can be synthesized for one time or for multiple of times (for at least two times) so as to obtain the synthetic hollowed base plate C11 which includes the mold insert.

For instance, the bottom-layer hollowed base plate L11, the first hollowed base plate L12 at the middle and the second hollowed base plate L13 at the middle are synthesized by means of screen-printing glue adhering and/or laminating according to the sizes of the hollowed areas of the five hollowed base plates so as to obtain a first synthetic hollowed base plate; the third hollowed base plate L14 at the middle and the top-layer hollowed base plate L15 are synthesized by means of screen-printing glue adhering and/or laminating so as to obtain a second synthetic hollowed base plate; the first synthetic hollowed base plate is put at the bottom layer, the second synthetic hollowed base plate is put at the top layer, and the first synthetic hollowed base plate and the second synthetic hollowed base plate are synthesized by means of screen-printing glue adhering and/or laminating so as to obtain the synthetic hollowed base plate C11 which includes mold insert.

In Embodiment 3, there are other methods for synthesizing the five hollowed base plates to obtain the five-layered hollowed base plate, more details will be not given herein.

Step 303, the mold insert is filled in the synthetic hollowed base plate; and in Embodiment 3, it can, but not limit to, take advantages of the adhering and/or laminating technology to fill the mold insert into the synthetic hollowed base plate C11 to obtain the synthetic hollowed base plate C11 which includes the mold insert.

Step 304, the synthetic hollowed base plate is coated on a binding agent to obtain the smart card;

the binding agent can be coated in a strip-shape evenly and with an equal interval on the surface of the synthetic hollowed base plate which includes the mold insert in it; and the coated binding agent is smoothed by means of a roller.

Figure 30:
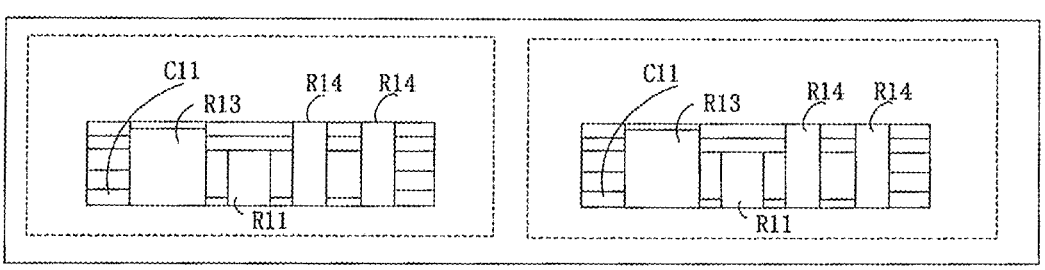
FIG. 30 shows a profile map of the synthetic hollowed base plate which includes a mold insert according to Embodiment 3 of the present invention.

In Embodiment 3, it provides a profile of the synthetic hollowed base plate which includes the mold insert, which can but not limit to be shown in FIG. 30.

It is noted that it can fill the binding agent into the gap between the base plate which includes the mold insert and the synthetic hollowed base plate C01 after Step 303 to make the mold insert fit closely with the synthetic hollowed base plate C01 in Embodiment 3.

In Embodiment 3, after coating the binding agent on the synthetic hollowed base plate, the method further includes: coating lamination on the synthetic hollowed base plate; and in Embodiment 3, a slice-shaped material made of synthetic resin applies to a covering layer coated on the surface of the synthetic hollowed base plate C11 which includes the mold insert, and the material can be at least one sort of PVC, PC, PETG, PET and ABS PVC resin.

In Embodiment 3, it provides the covering layer of the smart card, which includes a first printing design layer, a first printing material layer and a first printing-protected layer; the first printing material layer is located between the synthetic hollowed base plate and the first printed design layer, the first printed design is located between the first printing material layer and the first printing-protected layer. The covering layer further includes lamination which is located between the synthetic hollowed base plate and the first printing material layer.

The first printing material layer is located between the synthetic hollowed base plate and the first printed design layer, the first printed design layer is located between the first printing material and the first printing-protected layer in the case that the covering layer specifically includes the first printed design layer, the first printing material layer and the first printing-protected layer.

The lamination is located between the synthetic hollowed base plate and the first printing material layer, the first printing material layer is located between the lamination and the first printed design layer, and the first printed design layer is located between the first printing material layer and the first printing-protected layer in the case that the covering layer specifically includes the lamination, the first printed design layer, the first printing material layer and the first printing-protected layer.

In Embodiment 3, it further provides another covering layer, which includes a second printed design layer and a second printing material layer, and the second printing material layer is transparent. The slice-shaped material made of synthetic resin applies to the second printing material layer, and the material can be at least one sort of PVC, PC, PETG, PET and ABS PVC resin.

The second printed design layer is located between the second printing material layer and the synthetic hollowed base plate in the case that the covering layer specifically includes the second printed design layer and the second printing material layer.

The lamination is located between the synthetic hollowed base plate and the second printed design layer, and the second printed design layer is located between the second printing material and the lamination in the case that the covering layer specifically includes the lamination, the second printed design layer and the second printing material layer.

In Embodiment 3, the first printed design layer is a layer which has a pattern on it, the first printing material layer is configured to have the pattern printed thereon, the first printing-protected layer is configured to protect the first printed design layer, the first printing material layer can be transparent or non-transparent, and the first printing-protect layer can be all transparent, or a part thereof which contacts with the printed design is transparent.

In Embodiment 3, the second printed design layer is a layer which has a printed pattern on it, the second printing material is configured to print the pattern on it, the second printing material layer can be all transparent or a part thereof which contacts with the printed design of the second printed design layer is transparent.

In Embodiment 3, the printed pattern is printed on the second printing material layer through the reprint printing technology so as to obtain the covering layer which includes the second printed design layer and the second printing material layer.

In Embodiment 3, before Step 304, the method further includes: coating lamination on the top-layer hollowed base plate.

The production process of the present invention can be combined with multiple sorts of electronic component which is with a power supply or without a power supply, and includes a smart card chip, a RFID chip and antenna, a fingerprint-identified sensor, a resistance-capacitance, a crystal oscillator and chip, etc.

Embodiment 4

A smart card according to Embodiment 4 of the present invention includes: a synthetic hollowed base plate and a covering layer coated on the synthetic hollowed base plate.

The synthetic hollowed base plate includes a mold insert.

The synthetic hollowed base plate includes three layers of hollowed base plates, which are a bottom-layer hollowed base plate, a middle-layer hollowed base plate and a top-layer hollowed base plate.

In Embodiment 4, the sum of the thicknesses of the three layers of the hollowed base plates is a preset total thickness.

In Embodiment 4, the mold insert includes an interactive circuit module which is a circuit module with a human-computer interactive function.

In Embodiment 4, the mold insert can further include a non-interactive circuit module which is a circuit module without a human-computer interactive function.

In Embodiment 4, the height of each circuit module can be same as each other or be different from each other, preferably, the height of the interactive circuit module is higher than the height of the non-interactive circuit module. Correspondingly, the interactive circuit module is at least located in the hollowed area of the top-layer hollowed base plate; the non-interactive circuit module is at least located in the hollowed area of one layer of the bottom-layer hollowed base plate, the middle-layer hollowed base plate and the top-layer hollowed base plate. Preferably, the interactive circuit module is located in the hollowed areas of the bottom-layer hollowed base plate, the middle-layer hollowed base plate and the top-layer hollowed base plate; and the non-interactive circuit module is at least located in the hollowed area of the bottom-layer hollowed base plate.

In Embodiment 4, the interactive circuit module includes the key module and the display module, and the non-interactive module includes the power supply module and the control module, etc.

Specifically, in the case that the height of the key module and the height of the display module are higher than the height of the power supply module and the height of the control module, the key module is located in the hollowed areas of the bottom-layer hollowed base plate, the middle-layer hollowed base plate and the top-layer hollowed base plate; the display module is located in the hollowed areas of the bottom-layer hollowed base plate, the middle-layer hollowed base plate and the top-layer hollowed base plate; the power-supply module is at least located in the hollowed area of the bottom-layer hollowed base plate; and the control module is at least located in the hollowed area of the bottom-layer hollowed base plate.

In the case that the heights of the key module and the display module are higher than the heights of the power-supply module and the control module, and the height of the power-supply module is higher than the height of the control module, the key module and the display module are located in the hollowed areas of the bottom-layer hollowed base plate, the middle-layer hollowed base plate and the top-layer hollowed base plate; the power-supply module is at least located in the hollowed areas of the bottom-layer hollowed base plate and the middle-layer hollowed base plate; and the control module is at least located in the hollowed area of the bottom-layer hollowed base plate.

In the case that the heights of the key module and the display module are higher than the heights of the power-supply module and the control module, and the height of the control module is higher than the height of the power-supply module, the key module and the display module are located in the hollowed areas of the bottom-layer hollowed base plate, the middle-layer hollowed base plate and the top-layer hollowed base plate; the control module is at least located in the hollowed areas of the bottom-layer hollowed base plate and the middle-layer hollowed base plate; and the power-supply module is at least located in the hollowed area of the bottom-layer hollowed base plate.

In the case of both the heights of the key module and the display module are higher than the heights of the power-supply module and the control module, and the height of the power-supply module equals the height of the control module, the key module and the display module are located in the hollowed areas of the bottom-layer hollowed base plate, the middle-layer hollowed base plate and the top-layer hollowed base plate; and the power-supply module and the control module are at least located in the hollowed area of the bottom-layer hollowed base plate.

In Embodiment 4, the key module includes electronic components, such as a key, the display module can specifically include electronic components, such as a display screen, the power-supply module includes electronic components, such as a battery, the control module includes electronic components, such as a circuit board and a microcontroller, in which the display screen, the battery, the microcontroller and the key are integrated on the circuit board.

In Embodiment 4, it provides a covering layer of a smart card, which includes a first printed design layer, a first printing material layer and a first printing-protected layer; the first printing material layer is located between the synthetic hollowed base plate and the first printed design layer, and the first printed design layer is located between the first printing material layer and the first printing-protected layer. The covering layer further includes the lamination which is located between the synthetic hollowed base plate and the first printing material layer.

In Embodiment 4, the first printed design layer is a layer which has a pattern on it, the first printing material layer is configured to print the pattern on it, the first printing-protected layer is configured to protect the layer of the first printed design layer, the first printing material layer can be transparent or non-transparent, and the first printing-protect layer can be all transparent, or a part thereof which contacts with the printed design is transparent.

In Embodiment 4, it further provides another covering layer, which includes a second printed design layer and a second printing material; the second printing material layer is transparent. The second printed design layer is located between the second printing material layer and the synthetic hollowed base plate. The covering layer further includes the lamination which is located between the synthetic hollowed base plate and the second printed design layer.

In Embodiment 4, the second printed design layer is a layer which has a printed pattern on it, the second printing material is configured to print the pattern on it, the second printing material layer can be all transparent, or a part thereof which contacts with the printed pattern of the second printed design layer is transparent.

In Embodiment 4, the material of the covering layer is at least one selected from the group consisting of PVC (Polyvinyl Chloride), PC (Polycarbonate), PETG (Poly ethylene terephthalateco-1,4-cyclohexylenedimethylene terephthalate), PET (poly (ethylene terephthalate)) and ABS PVC resin.

In Embodiment 4, the printed pattern on the second printed design layer is visible when someone looks at the second printed design layer through the transparent second printing material, the printed pattern on the first printed design is visible when someone looks at the first printed design layer through the transparent first printing-protected layer. Meanwhile, the second printing material, which is on the second printed design layer, can protect the second printed design layer. Thus, comparing to the covering layer which includes the first printed design layer, the first printing material layer and the first printing-protected layer, and the covering layer which includes the second printed design layer and the second printing material layer can realize the same function and make the smart card thinner.

In Embodiment 4, the slice-shaped material made of synthetic resin applies to the lamination, and the material can be at least one sort of PVC, PC, PETG, PET and ABS PVC resin.

In Embodiment 4, it provides a smart card with a human-computer interactive function, which includes a synthetic hollowed base plate and a covering layer coated on the synthetic hollowed base plate, the synthetic hollowed base plate includes three layers of hollowed base plates, which respectively are the bottom-layer hollowed base plate, the middle-layer hollowed base plate and the top-layer hollowed base plate, and the synthetic hollowed base plate includes the mold insert in it, the above structure can make the smart card more stable, meanwhile the smart card are more fold-resistant. The mold insert in Embodiment 4 includes an interactive circuit module, can further include a non-interactive circuit module. The smart card provided in Embodiment 4, given the different heights of the interactive circuit module and the non-interactive circuit module, the interactive circuit module is at least located in the hollowed area of the top-layer hollowed base plate, while the non-interactive circuit module is at least located in the hollowed area of one layer of the three layers of the hollowed base plates, such a structure can give the non-interactive circuit module more protection, increase stability of the interactive circuit module and the non-interactive circuit module in the smart card, and further improve fold-resistant of the smart card. In this way, the smart card can be used for longer.

Figure 31:
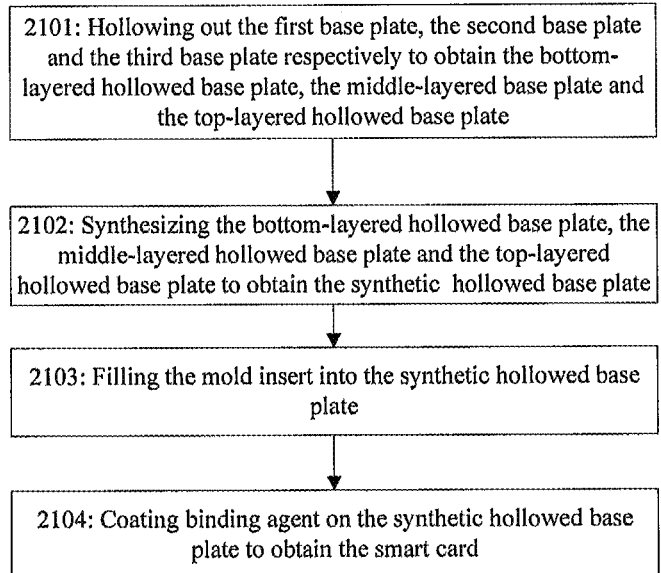
FIG. 31 shows a flow chart of a method for making a smart card according to Embodiment 4 of the present invention.

A method for making a smart card in Embodiment 4, as shown in FIG. 31, specifically includes:

Step 2101, the first base plate, the second base plate and the third base plate are hollowed out respectively to obtain the bottom-layer hollowed base plate, the middle-layer hollowed base plate, and the top-layer hollowed base plate.

In the present invention, the first base plate, the second base plate and the third base plate can be the same base plate. In Embodiment 4, preferably, the first base plate, the second base plate and the third base plate are three base plates, in which the shapes of the first base plate, the second base plate and the third base plates can be the same as each other or be different from each other. The slice-shaped material made of synthetic resin applies to the first base plate, the second base plate and the third base plate, and the material can be at least one sort of PVC, PC, PETG, PET and ABS PVC resin.

In Embodiment 4, the first base plate, the second base plate and the third base plate are hollowed out respectively by means of punching, die cutting or milling so as to obtain the bottom-layer hollowed base plate, the middle-layer hollowed base plate and the top-layer hollowed base plate.

In Embodiment 4, hollowing out the first base plate, the second base plate and the third base plate respectively to obtain the bottom-layer hollowed base plate, the middle-layer hollowed base plate and the top-layer hollowed base plate specifically includes:

hollowing out the first base plate according to the first preset hollowed area to obtain the bottom-layer hollowed base plate, and the bottom-layer hollowed base plate includes a bottom-layer hollowed;

hollowing out the second base plate according to the second preset hollowed area to obtain the middle-layer hollowed base plate, and the middle-layer hollowed base plate includes a middle-layer hollowed area; and hollowing out the third base plate according to the third preset hollowed area to obtain the top-layer hollowed base plate, and the top-layer hollowed base plate includes a top-layer hollowed area.

In Embodiment 4, hollowing out the first base plate, the second base plate and the third base plate respectively to obtain the bottom-layer hollowed base plate, the middle-layer hollowed base plate and the top-layer hollowed base plate specifically includes:

hollowing out the first base plate according to the first preset hollowed area and the first preset thickness so as to obtain the bottom-layer hollowed base plate which includes the bottom-layer hollowed area;

hollowing out the second base plate according to the second preset hollowed area and the second preset thickness to obtain the middle-layer hollowed base plate which includes the middle-layer hollowed area; and hollowing out the third base plate according to the third preset hollowed area and the third preset thickness to obtain the top-layer hollowed base plate which includes the top-layer hollowed area.

It is noted that the first preset hollowed area, the second preset hollowed area and the third preset hollowed area are determined according to the mold insert, specifically, the first preset hollowed area, the second preset hollowed area and the third preset hollowed area are determined according to the locations and the heights of the interactive circuit module and the non-interactive circuit module of the mold insert; the first preset thickness corresponding to the first preset hollowed area, the second preset thickness corresponding to the second preset hollowed area and the third preset thickness corresponding to the third preset hollowed area can further be determined according to the mold insert. Specifically, the first preset thickness corresponding to the first preset hollowed area, the second preset thickness corresponding to the second preset hollowed area and the third preset thickness corresponding to the third preset hollowed area are determined according to the locations and the heights of the interactive circuit module and the non-interactive circuit module of the mold insert. The sum of the thicknesses of the bottom-layer hollowed base plate, the middle-layer hollowed base plate and the top-layer hollowed base plate is at least equivalent to the height of the mold insert. The sum of the thicknesses of the bottom-layer hollowed base plate, the middle-layer hollowed base plate and the top-layer hollowed base plate is the preset total thickness.

Step 2102, the bottom-layer hollowed base plate, the middle-layer hollowed base plate and the top-layer hollowed base plate are synthesized to obtain the synthetic hollowed base plate.

Specifically, the bottom-layer hollowed base plate, the middle-layer hollowed base plate and the top-layer hollowed base plate are synthesized so as to obtain the synthetic hollowed base plate which includes the mold insert.

In Embodiment 4, it can but not limit to take advantages of adhering and/or laminating technology to synthesize the bottom-layer hollowed base plate, the middle-layer hollowed base plate and the top-layer hollowed base plate so as to obtain the synthetic hollowed base plate which includes the mold insert.

It is noted that the bottom-layer hollowed base plate, the middle-layer hollowed base plate and the top-layer hollowed base plate are synthesized for all once or for multiple times (at least for two times) according to the hollowed areas of the bottom-layer hollowed base plate, the middle-layer hollowed base plate and the top-layer hollowed base plate, preferably, according to the size of the hollowed area of the bottom-layer hollowed base plate, the size of the hollowed area of the middle-layer hollowed base plate and the size of the hollowed area of the top-layer hollowed base plate to obtain the synthetic hollowed base plate which includes the mold insert.

Step 2103, the mold insert is filled into the synthetic hollowed base plate.

In Embodiment 4, specifically, it can, but not limited to, take advantages of adhering and/or laminating technology to fill the mold insert into the synthetic hollowed base plate so as to obtain the synthetic hollowed base plate which includes the mold insert.

Step 2104, the synthetic hollowed base plate is coated on a binding agent to obtain the smart card;

the binding agent can be coated in a strip-shape evenly and with an equal interval on the surface of the synthetic hollowed base plate which includes the mold insert in it; and the coated binding agent is smoothed by means of a roller.

It is noted that it can fill the binding agent into the gap between the base plate which includes the mold insert and the synthetic hollowed base plate after Step 2103 to make the mold insert fit closely with the synthetic hollowed base plate in Embodiment 4.

In Embodiment 4, after the synthetic hollowed base plate is coated on the binding agent, the method further includes: coating a covering layer on the synthetic hollowed base plate.

In Embodiment 4, the covering layer on the surface of the synthetic hollowed base plate which includes a mold insert uses a slice-shaped material made of synthetic resin, and the raw material of the synthetic resin is made of at least one sort of PVC, PC, PETG, PET and ABS PVC resin.

In Embodiment 4, it provides the covering layer of the smart card, which includes the first printed design layer, the first printing material layer and the first printing-protected layer; the first printing material layer is located between the synthetic hollowed base plate and the first printed design layer, and the first printed design layer is located between the first printing material layer and the first printing-protected layer. The covering layer further includes lamination, which is located between the synthetic hollowed base plate and the first printing material layer.

In Embodiment 4, the first printed design layer is a layer which includes a printed pattern thereon, the first printing material layer is configured to a material layer which has the printed pattern printed on it, and the first printing-protected layer is configured to protect the first printed design layer, the first printing material can be transparent or nontransparent, and the first printing-protected layer can be all-transparent, or a part thereof which connects to the printed pattern in the first printed design layer is transparent.

In Embodiment 4, it further provides another covering layer, which includes the second printed design layer and the second printing material layer; and the second printing material is transparent. The second printed design layer is located between the second printing material layer and the synthetic hollowed base plate. The covering layer further includes the lamination, which is located between the synthetic hollowed base plate and the second printed design layer.

In Embodiment 4, the second printed design layer is the layer which has the printed pattern on it, the second printing material layer is configured to a material layer which has the printed pattern printed on it, the second printing material layer can be all transparent or a part of the second printing material layer which contacts with the printed design on the second printed design layer is transparent.

It is noted that, in Embodiment 4, an upper surface and a lower surface of the synthetic hollowed base plate can be coated with the covering layer which includes the first printed design layer, the first printing material layer and the first printing-protected layer or the covering layer which includes the second printed design layer, the second printing material layer and the second printing-protected layer respectively, or both of the upper surface and the lower surface of the synthetic hollowed base plate are coated with the covering layers which include the first printed design layer, the first printing material layer and the first printing-protected layer; or both of the upper surface and the lower surface of the synthetic hollowed base plate are coated with covering layers which include the second printed design layer and the second printing material layer. Correspondingly, the upper surface and/or the lower surface of the synthetic hollowed base plate can be coated with the lamination in the case that the covering layer further includes the lamination, which is located between the first printing material layer and the synthetic hollowed base plate or is located between the second printed design layer and the synthetic hollowed base plate.

It is noted that the lamination needs a roller to make the lamination contact with the synthetic hollowed base plate which includes the mold insert gradually in the case that the covering layer further includes the lamination, thus, it avoids the bubble during the lamination. The lamination can be all-transparent, can also be the area which corresponds to the interactive circuit module of the mold insert transparent, which can make the card holder key board enter and/or check the information displayed on the card.

In Embodiment 4, the printed design is printed on the second printing material layer through the reprint printing technology so as to obtain the covering layer which includes the second printed design layer and the second printing material layer.

In Embodiment 4, before Step 2104 the method further includes: coating lamination on the top-layer hollowed base plate.

It can combine multiple sorts of active and/or positive electronic components in the production process of the present invention, which include a smart card chip, RFID chip and antenna, fingerprint-identification sensor, resistance-capacitance (RC), crystal oscillator and chip, etc.

In Embodiment 4, it provides a method for making a smart card, which includes hollowing out three base plates respectively so as to obtain three hollowed base plates, the three hollowed base plates are the bottom-layer hollowed base plate, the middle-layer hollowed base plate and the top-layer hollowed base plate respectively; synthesizing the three hollowed base plates to obtain a three-layered hollowed base plate; filling the mold insert into the synthetic hollowed base plate, in this way, the smart card is easier to be manufactured and the efficiency of the smart card is improved. In the case that the mold insert in Embodiment 4 includes the interactive circuit module and includes the non-interactive circuit module, the method of making a smart card in Embodiment 4 includes hollowing three base plates according to the different heights of the interactive circuit module and the non-interactive circuit module to obtain three hollowed base plates, synthesizing the three hollowed base plates to obtain the three-layered synthetic hollowed base plate, the interactive circuit module is at least located in the hollowed area of the top-layer hollowed base plate of the synthetic hollowed base plate, and the non-interactive circuit module is at least located in the hollowed area of one layer of the synthetic hollowed base plate. In this way, the smart card is easier to be made and the efficiency of the smart card is improved, and the smart card is easier to be operated.

Embodiment 5

Figure 32:
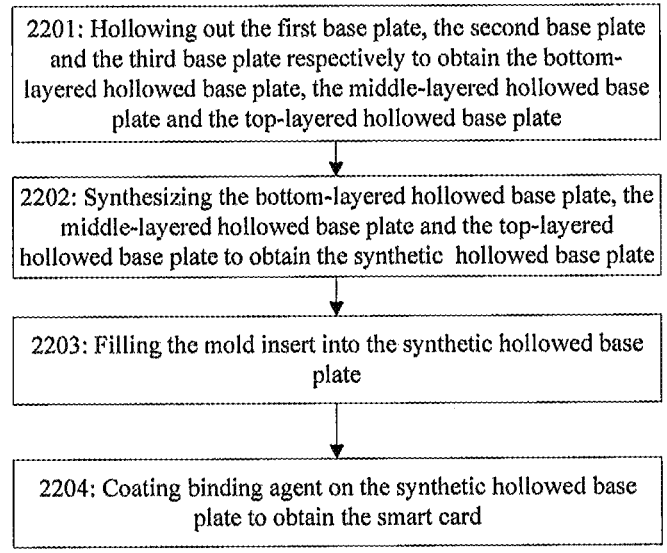
FIG. 32 shows a flow chart of a method for making a smart card according to Embodiment 5 of the present invention.

A method for making a smart card in Embodiment 5, as shown in FIG. 32, includes:

Step 2201, the first base plate, the second base plate and the third base plate are hollowed out to obtain the bottom-layer hollowed base plate, the middle-layer hollowed base plate and the top-layer hollowed base plate.

Figure 33:
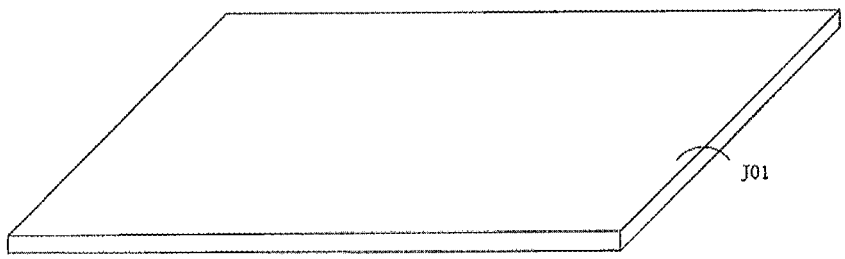
FIGS. 33-35 show schematic views of the base plates according to Embodiment 5 of the present invention.
Figure 34:
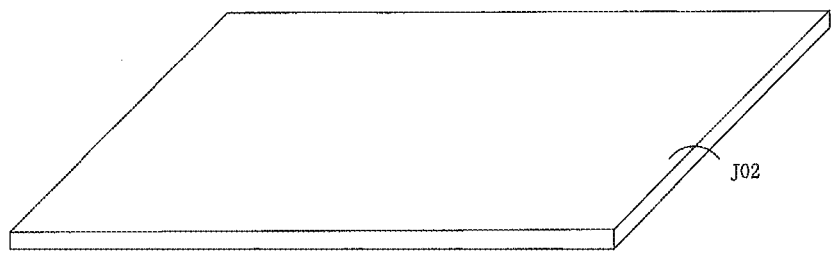
Figure 35:
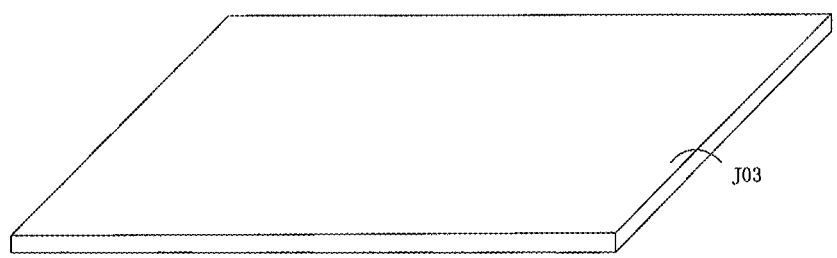

In Embodiment 5, preferably, the first base plate J01 is shown in FIG. 33; the second base plate J02 is shown in FIG. 34; and the third base plate is shown in FIG. 35.

Figure 36:
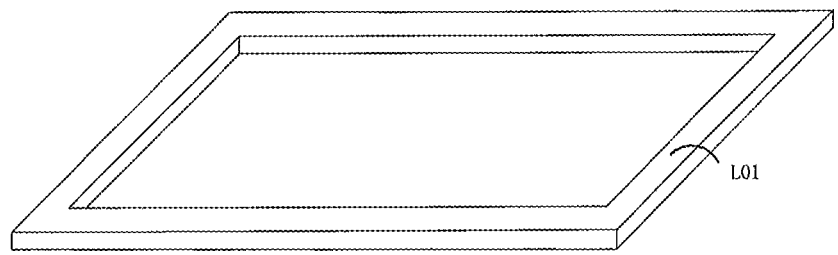
FIGS. 36-38 show schematic views of the hollowed base plates according to Embodiment 5 of the present invention.

Step 2201 specifically includes:

the first base plate J01 is hollowed out by means of punching, die cutting or milling according to the first preset hollowed area and the first preset thickness so as to obtain the bottom-layer hollowed base plate L01, and in Embodiment 5, the bottom-layer hollowed base plate L01 can be shown in FIG. 36.

Figure 37:
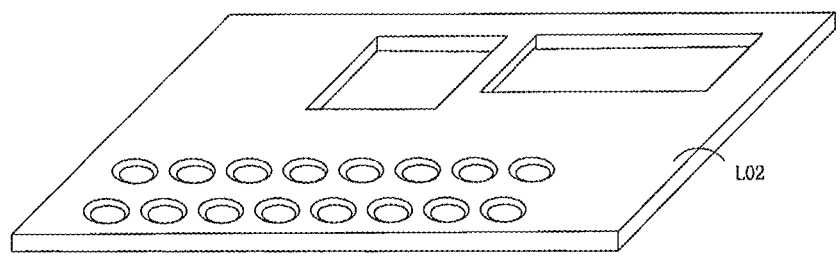

The second base plate J02 is hollowed out by means of punching, die cutting or milling according to the second preset hollowed area and the second preset thickness to obtain the middle-layer hollowed base plate L02; and in Embodiment 5, the middle-layer hollowed base plate L02 is shown in FIG. 37.

Figure 38:
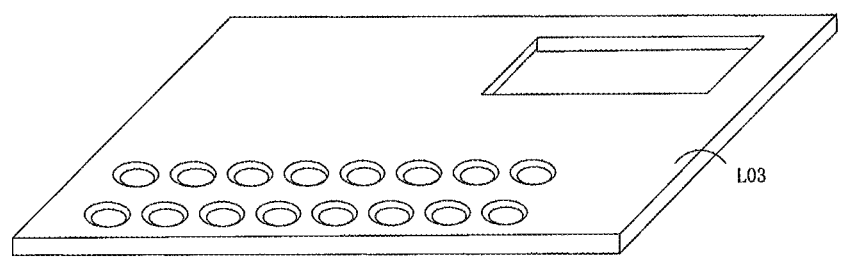

The third base plate J03 is hollowed out by means of punching, die cutting or milling according to the third preset hollowed area and the third preset thickness so as to obtain the top-layer hollowed base plate L03; and in Embodiment 5, the top-layer hollowed base plate L03 is shown in FIG. 38.

It is noted that the preset hollowed area and the preset thickness are determined according to the location and the height of each circuit module of the mold insert in Embodiment 5.

Figure 39:
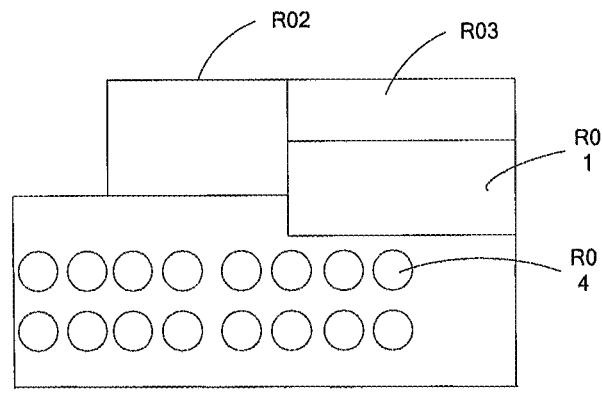
FIG. 39 shows a plane schematic view of the mold insert according to Embodiment 5 of the present invention.

In Embodiment 5, it provides a flat structural schematic of a mold insert. As shown in FIG. 39, the mold insert includes the control module R01, the power supply module R02, the display module R03 and the key module R04.

In Embodiment 5, the control module specifically includes electronic components, such as the circuit board and the microcontroller, in which the microcontroller and the key module R04 are integrated on the circuit board.

Figure 40:
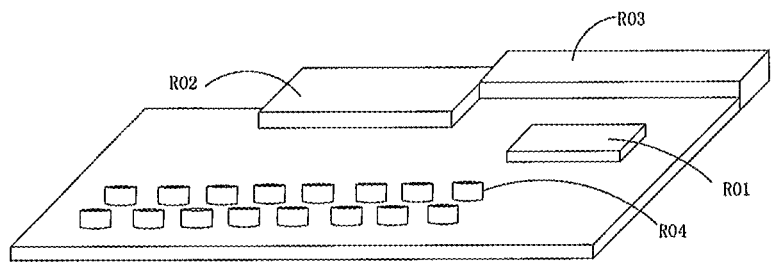
FIG. 40 shows a structural schematic view of the mold insert according to Embodiment 5 of the present invention.

In Embodiment 5, the stereoscopic structural schematic of the mold insert is shown in FIG. 40, which includes circuit modules, such as the control module R01, the power supply module R02, the display module R03 and the key module R04, in which the control module R01 specifically includes electronic components, such as the circuit board and the microcontroller, in which the microcontroller and the key module R04 are integrated on the circuit board, in which the height of the control module R01 is h01, the height of the power supply module R02 is h02, the height of the display module R03 is h03, the height of the key module R04 is h04.

In Embodiment 5, preferably, h04>h03>h02>h01, in which the display module R03 and the key module R04 are interactive circuit modules with a human-computer interactive function; the control module R01 and the power supply module R02 are non-interactive circuit modules without a human-computer interactive function.

In Embodiment 5, the first base plate J01 is hollowed out by means of punching, die cutting and milling according to the first preset hollowed area and the first preset thickness to obtain the bottom-layer hollowed base plate L01, the hollowed area of the L01 can at least be filled with all of the circuit modules in the mold insert, that is, the hollowed area of the bottom-layer hollowed base plate L01 can be at least filled with the control module R01, the power supply module R02, the display module R03 and the key module R04; the thickness of the bottom-layer hollowed base plate L01 is at least equivalent to the height of the highest circuit module which cannot be filled into the middle-layer hollowed base plate L02, that is the thickness of the bottom-layer hollowed base plate L01 is at least equivalent to the height h01 of the control module R01, the second base plate J02 is hollowed by means of punching, die cutting or milling according to the second preset hollowed area and the second preset thickness to obtain the middle-layer hollowed base plate L02, the hollowed area of the middle-layer hollowed base plate L02 can at least be filled with the circuit module with the human-computer interactive function and the circuit module whose height is higher than the first preset thickness and which can be filled into the top-layer hollowed base plate L03, that means the hollowed area of the middle-layer hollowed base plate L02 can at least be filled with the display module R03, the key module R04 and the power supply module R02; and the thickness of the middle-layer hollowed base plate L02 is at least equivalent to the difference between the height of the highest circuit module which cannot be filled in the top-layer hollowed base plate L03 and the height of the highest circuit module which cannot be filled into the middle-layer hollowed base plate L02, that means the thickness of the middle-layer hollowed base plate L02 is at least equivalent to the difference between the height of the power supply module R02, which is h02, and the height of the control module R01 which is h01 (h02-h01).

The third base plate J03 is hollowed out by means of punching, die cutting or milling according to the third preset hollowed area and the third preset thickness so as to obtain the top-layer hollowed base plate L03, the hollowed area of the top-layer hollowed base plate L03 can at least be filled with the circuit module with the human-computer interactive function, that means the hollowed area of the top-layer hollowed base plate L03 can at least be filled with the display module R03 and the key module R04; and the thickness of the top-layer hollowed base plate L03 is at least equivalent to the difference between the height of the highest circuit module filled in the top-layer hollowed base plate and the height of the highest circuit module which cannot be filled into the top-layer hollowed base plate L03, that means the thickness of the top-layer hollowed base plate L03 is at least equivalent to the difference between the height of the key module R04, which is h04, and the height of the power supply module R02 which is h02 (h04-h02).

It is noted that the sum of the thickness of the bottom-layer hollowed base plate L01, the thickness of the middle-layer hollowed base plate L02 and the thickness of the top-layer hollowed base plate L03 is at most equivalent to the preset total thickness.

Figure 41:
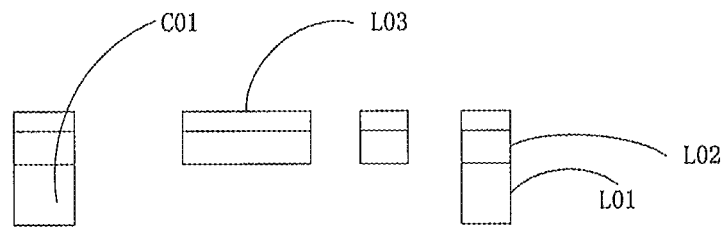
FIG. 41 shows a profile map of the synthetic hollowed base plate according to Embodiment 5 of the present invention.

Step 2202, the bottom-layer hollowed base plate, the middle-layer hollowed base plate and the top-layer hollowed base plate are synthesized so as to obtain the synthetic hollowed base plate; and in Embodiment 5, it can, but not limit to, take advantages of adhering and/or laminating to synthesize the bottom-layer hollowed base plate L01, the middle-layer hollowed base plate L02 and the top-layer hollowed base plate L03 so as to obtain the synthetic hollowed base plate C01, preferably, the bottom-layer hollowed base plate L01, the middle-layer hollowed base plate L02 and the top-layer hollowed base plate L03 are synthesized according to the size of the hollowed areas of the bottom-layer hollowed base plate L01, the middle-layer hollowed base plate L02 and the top-layer hollowed base plate L03 to obtain the synthetic hollowed base plate which includes the mold insert. In Embodiment 5, it provides a profile of the synthetic hollowed base plate C01 which is not limit to be shown in FIG. 41.

It is noted that the bottom-layer hollowed base plate L01, the middle-layer hollowed base plate L02 and the top-layer hollowed base plate L03 are synthesized for all at once or for multiple of times (for at least two times) to obtain the synthetic hollowed base plate C01 which includes the mold insert in Embodiment 5.

For instance, the bottom-layer hollowed base plate L01 is put at the bottom layer, the middle-layer hollowed base plate L02 is put at the middle layer, and the top-layer hollowed base plate L03 is put at the top layer in accordance with the size of the hollowed areas of the bottom-layer hollowed base plate L01, the middle-layer hollowed base plate L02 and the top-layer hollowed base plate L03, and synthesize the three layers of the hollowed base plates by means of screen-printing glue adhering and/or laminating to obtain the synthetic hollowed base plate C01 which includes the mold insert; or the bottom-layer hollowed base plate L01 is put at the bottom layer and the middle-layer hollowed base plate L02 is put at the top layer in accordance with the size of the hollowed areas of the bottom-layer hollowed base plate L01, the middle-layer hollowed base plate L02 and the top-layer hollowed base plate L03 by means of screen-printing glue adhering and/or laminating to synthesize the bottom-layer hollowed base plate L01 and the middle-layer hollowed base plate L02 to obtain a first synthetic hollowed base plate; the first synthetic hollowed base plate is put at the bottom layer, the top-layer hollowed base plate L03 is put at the top layer, and the top-layer hollowed base plate L03 and the first synthetic hollowed base plate are synthesized by means of screen-printing glue adhering and/or laminating to obtain the synthetic hollowed base plate C01 which includes the mold insert.

The middle-layer hollowed base plate L02 and the top-layer hollowed base plate L03 can be synthesized firstly, and then the synthetic hollowed base plate and the bottom-layer hollowed base plate L01 are synthesized.

In Embodiment 5, there are other methods for synthesizing the bottom-layer hollowed base plate L01, the middle-layer hollowed base plate L02 and the top-layer hollowed base plate L03 to obtain the synthetic hollowed base plate, more details will not be given herein.

Step 2203, the mold insert is filled into the synthetic hollowed base plate.

In Embodiment 5, it can but not limit to take advantages of adhering and/or laminating technique to fill the mold insert into the synthetic hollowed base plate C01 so as to obtain the synthetic hollowed base plate which includes the mold insert.

Step 2204, the synthetic hollowed base plate is coated on a binding agent to obtain a smart card.

The binding agent can be coated in a strip-shape evenly and with an equal interval on the surface of the synthetic hollowed base plate which includes the mold insert in it by an auto-coating device, such as auto-dispenser; and the coated binding agent is smoothed by means of a roller.

Figure 42:
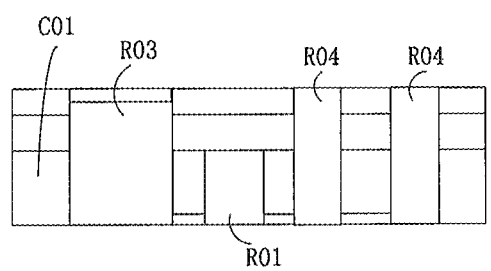
FIG. 42 shows a profile map of the synthetic hollowed base plate which includes the mold insert according to Embodiment 5 of the present invention.

In Embodiment 5, it provides a profile of the synthetic hollowed base plate C01 which includes the mold insert, which can be, but not limit to, shown in FIG. 42. It needs to be noted that the binding agent can be filled into the gap between the mold insert and the synthetic hollowed base plate C01 after Step 2203 to ensure that the mold insert can be adhered with the synthetic hollowed base plate C01 closely.

In Embodiment 5, after the synthetic hollowed base plate is coated on binding agent, the method further includes coating a covering layer on the synthetic hollowed base plate.

In Embodiment 5, a slice-shaped synthetic resin material applies to the covering layer coated on the synthetic hollowed base plate which includes the mold insert, and the material can be at least one sort of PVC, PC, PETG, PET and ABS PVC resin.

In Embodiment 5, it provides a covering layer, which includes a first printed design layer, a first printing material layer and a first printing-protected layer; the first printing material layer is located between the synthetic hollowed base plate and the first printed design layer, and the first printed design layer is located between the first printing material layer and the first printing-protected layer. The covering layer further includes the lamination, which is located between the synthetic hollowed base plate and the first printing material layer.

Figure 43:
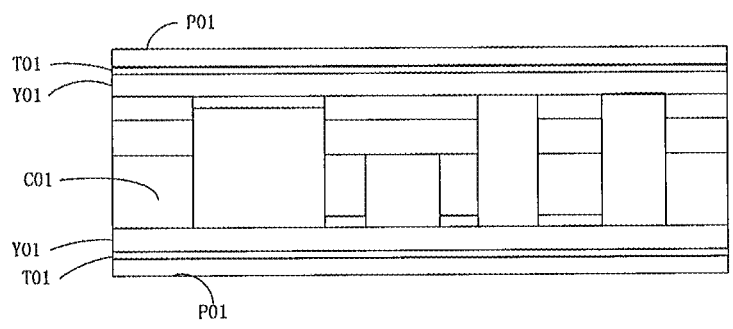

In the case that the covering layer specifically includes the first printed design layer, the first printing material layer and the first printing-protected layer, a profile of the smart card obtained by means of the above technique can be shown in FIG. 43, in which the first printing material layer Y01 is located between the synthetic hollowed base plate C01 and the first printed design layer T01, and the first printed design layer T01 is located between the first printing material Y01 and the first printing-protected layer P01.

In the case that the covering layer specifically includes the lamination, the first printed design layer, the first printing material layer, the first printing-protected layer, the profile of the smart card obtained by means of the above technique is shown in FIG. 44, the lamination M01 is located between the synthetic hollowed base plate C01 and the first printing material layer Y01, the first printing material layer Y01 is located between the lamination M01 and the first printed design layer T01, and the first printed design layer T01 is located between the first printing material layer Y01 and the first printing-protected layer P01.

In Embodiment 5, it provides another covering layer, as shown in FIG. 45, including: a second printed design layer T02 and a second printing material Y02, and the second printing material Y02 is transparent. The slice-shaped material made of synthetic resin applies to the second printing material Y02, and the material can be at least one sort of PVC, PC, PETG, PET and ABS PVC.

In the case that the covering layer specifically includes the second printed design layer and the second printing material layer, the profile of the obtained smart card is shown in FIG. 46, in which the second printed design layer T02 is located between the second printing material layer Y02 and the synthetic hollowed base plate C01.

In the case that the covering layer specifically includes the lamination, the second printed design layer and the second printing material layer, the profile of the obtained smart card is shown in FIG. 47, in which the lamination M01 is located between the synthetic hollowed base plate C01 and the second printed design layer T02, and the second printed design layer T02 is located between the second printing material Y02 and the lamination M01.

A roller is used during the process of coating the lamination in the case that the covering layer includes the lamination to make sure that the lamination can contact the base plate which includes a mold insert gradually to avoid from producing bubbles when the lamination is coated.

In Embodiment 5, the lamination coated on the surface of the synthetic hollowed base plate C01 which includes the mold insert is plastic film. In the present Embodiment, a slice-shaped synthetic resin material applies to the lamination, and the material can be at least one sort of PVC, PC, PETG, PET and ABS PVC resin. The area of lamination which corresponds to the display module R03 and the key module R04 is transparent in order that the card holder can enter key and check displayed information.

In Embodiment 5, the first printed design layer is a layer which has a pattern on it, the first printing material layer is configured to print the pattern on it, the first printing-protected layer is configured to protect the layer of the first printed design layer, the first printing material layer can be transparent or non-transparent, and the first printing-protect layer can be all transparent, or a part thereof which contacts with the printed design is transparent.

In Embodiment 5, the second printed design layer is a layer which has a printed pattern on it, the second printing material is configured to print the pattern on it, the second printing material layer can be all transparent, or a part thereof which contacts with the printed design of the second printed design layer is transparent.

In Embodiment 5, the printed pattern is printed on the second printing material layer through the reprint printing technology so as to obtain the covering layer which includes the second printed design layer and the second printing material layer.

In Embodiment 5, before Step 2204, the method further includes: coating lamination on the top-layer hollowed base plate.

The production process of the present invention can be combined with multiple sorts of electronic component which is with a power supply or without a power supply, and includes a smart card chip, a RFID chip and antenna, a fingerprint-identified sensor, a resistance-capacitance, a crystal oscillator and chip, etc.

Embodiment 6

Figure 49:
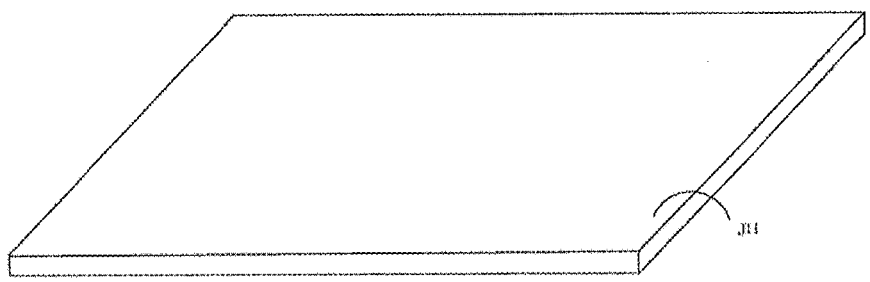
FIGS. 49-51 show schematic views of base plate according to Embodiment 6 of the present invention.
Figure 50:
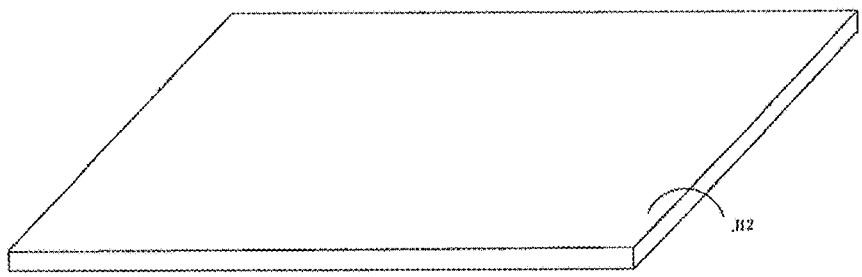
Figure 51:
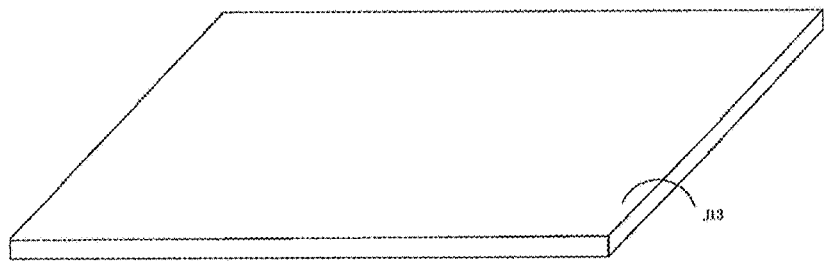

It provides a method for making a smart card according to Embodiment 6 of the present invention. As shown in FIG. 48, the method specifically includes:

Step 2301, the first base plate, the second base plate and the third base plate are hollowed out respectively to obtain the bottom-layer hollowed base plate, the middle-layer hollowed base plate and the top-layer hollowed base plate; and in Embodiment 6, preferably, the first base plate J11 is shown in FIG. 49; the second base plate J12 is shown in FIG. 50; the third base plate J13 is shown in FIG. 51.

Figure 52:
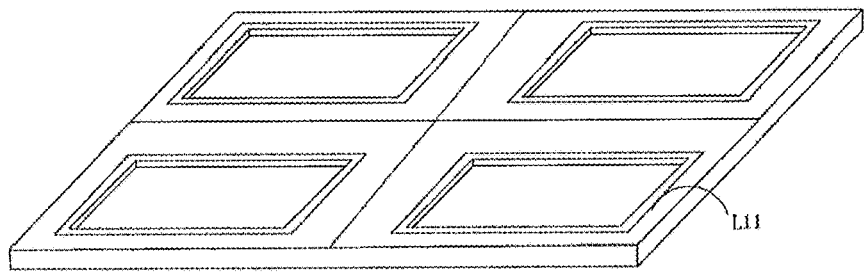
FIGS. 52-54 show schematic views of the hollowed base plate according to Embodiment 6 of the present invention.

Step 2301 specifically includes:

the first base plate J11 is hollowed out by means of punching, die cutting or milling according to the first preset hollowed area and the first preset thickness to obtain the bottom-layer hollowed base plate L11, and in Embodiment 6, the bottom-layer hollowed base plate L11 can be shown in FIG. 52.

Figure 53:
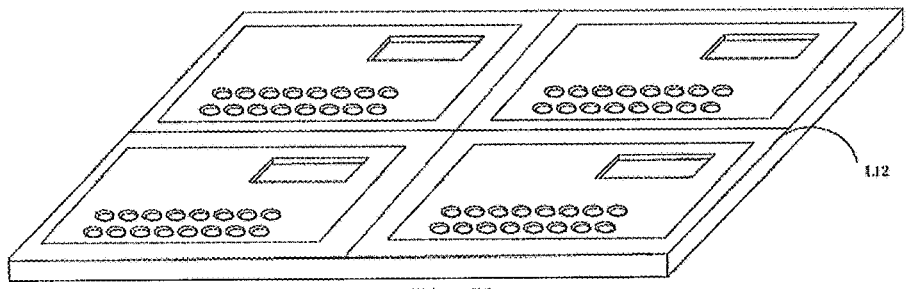

The second base plate J12 is hollowed out by means of punching, die cutting and milling according to the second preset hollowed area and the second preset thickness to obtain the middle-layer hollowed base plate L12, and in Embodiment 6, the middle-layer hollowed base plate L12 can be shown in FIG. 53.

Figure 54:
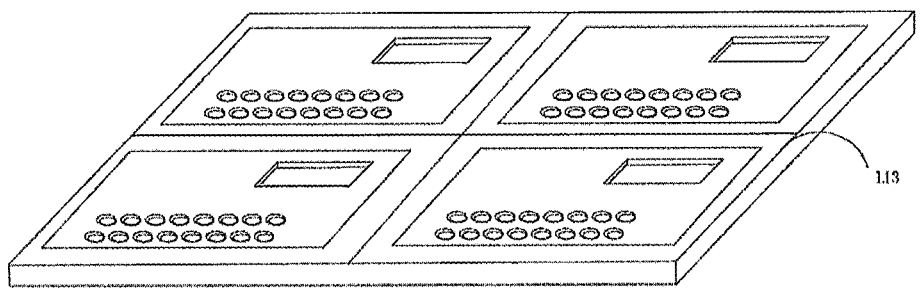

The third base plate J13 is hollowed out by means of punching, die cutting or milling according to the third preset hollowed area and the third preset thickness to obtain the top-layer hollowed base plate L13, and in Embodiment 6, the top-layer hollowed base plate L13 can be shown in FIG. 54.

It is noted that in Embodiment 6, the preset hollowed area and the preset thickness are determined according to locations and heights of every of circuit modules of the mold insert.

Figure 55:
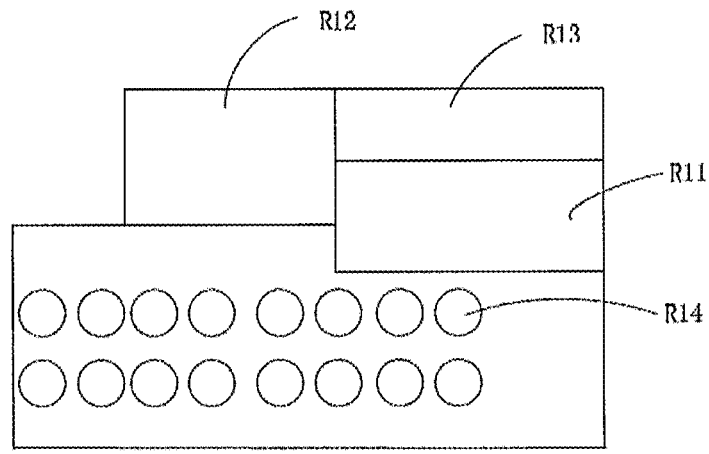
FIG. 55 shows a plane schematic view of the mold insert according to Embodiment 6 of the present invention.

In Embodiment 6, it provides a flat structural schematic of a mold insert. As shown in FIG. 55, the mold insert includes circuit modules, such as the control module R11, the power supply module R12, the display module R13 and the key module R14.

In Embodiment 6, the control module R11 specifically includes electronic components, such as the circuit board and the microcontroller, in which the microcontroller and the key module R14 are integrated on the circuit board.

Figure 56:
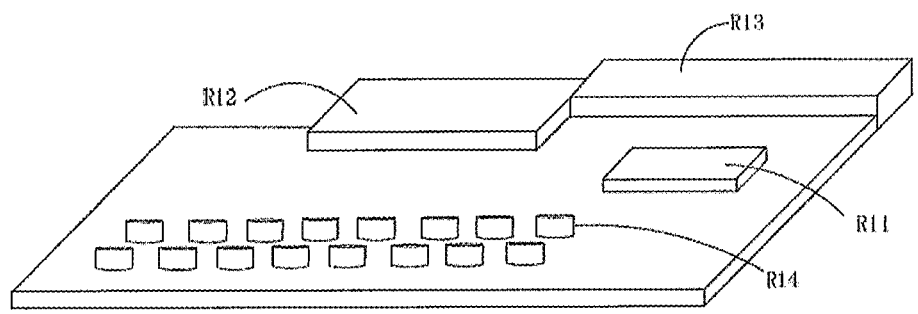
FIG. 56 shows a structural schematic view of the mold insert according to Embodiment 6 of the present invention.

In Embodiment 6, the stereoscopic structural schematic of the mold insert is shown in FIG. 56, which includes circuit module, such as the control module R11, the power supply module R12, the display module R13 and the key module R14, in which the control module includes electronic components, such as the circuit board and the microcontroller, in which the microcontroller and the key module R14 are integrated on the circuit board, in which the height of the control module R11 is h11, the height of the power supply module R12 is h12, the height of the display module R13 is h13, and the height of the key module R14 is h14.

In Embodiment 6, preferably, h14>h13>h12=h11, in which the display module R13 and the key module R14 are interactive circuit module with the human-computer interactive function; the control module R11 and the power supply module R12 are non-interactive circuit module without the human-computer interactive function.

In Embodiment 6, the hollowed area of the bottom-layer hollowed base plate L11 which is obtained by means of punching, die cutting or milling to hollow out the first base plate J11 according to the first preset hollowed area and the first preset thickness can at least be filled with all of the circuit modules in the mold insert, that means the hollowed area of the bottom-layer hollowed base plate L11 can at least be filled with the control module R11, the power supply module R12, the display module R13 and the key module R14, the thickness of the bottom-layer hollowed base plate L11 is at least equivalent to the height of the highest circuit module which cannot be filled into the middle-layer hollowed base plate L12, that means the thickness of the bottom-layer hollowed base plate L11 is at least equivalent to the height of the control module R11 which is h11 or the height of the power supply module R12, which is h12.

The second base plate J12 is hollowed out by means of punching, die cutting or milling according to the second preset hollowed area and the second preset thickness to obtain the middle-layer hollowed base plate L12, and the hollowed area of the middle-layer hollowed base plate L12 can at least be filled with the circuit module with the human-computer interactive function and the circuit module whose height is higher than the first preset thickness and which cannot be filled into the top-layer hollowed base plate L13, that means the hollowed area of the middle-layer hollowed base plate L12 is filled with the display module R13 and the key module R14; and the thickness of the middle-layer hollowed base plate L12 is thicker than the difference between the height of the highest circuit module which cannot be filled into the top-layer hollowed base plate L13 and the height of the highest circuit module which cannot be filled into the middle-layer hollowed base plate L12, that means the thickness of the middle-layer hollowed base plate L12 is thicker than the difference between the height h12 of the power supply module R12 and the height h11 of the control module R11, that means the thickness of the middle-layer hollowed base plate is thicker than 0.

The third base plate J13 is hollowed out by means of punching, die cutting or milling according to the third preset hollowed area and the third preset thickness to obtain the top-layer hollowed base plate L13, and the hollowed area of the top-layer hollowed base plate L13 can at least be filled with the circuit module with the human-computer interactive function, that means the hollowed area of the top-layer hollowed base plate L13 can at least be filled with the display module R13 and the key module R14; and the sum of the thickness of the middle-layer hollowed base plate L12 and thickness of the top-layer hollowed base plate L13 is at least equivalent to the difference between the height of the highest circuit module which can be filled into the top-layer hollowed base plate L13 and the height of the highest circuit module which cannot be filled into the top-layer hollowed base plate L13, that means the sum of the thickness of the middle-layer hollowed base plate L12 and the thickness of the top-layer hollowed base plate L13 is at least equivalent to the difference between the height h14 of the key module R14 and the height h12 of the power supply module R12 (h14-h12) or the difference between the height h14 of the key module R14 and the height h11 of the control module R11 (h14-h11).

It is noted that in Embodiment 6, both the hollowed area of the middle-layer hollowed base plate L12 and the hollowed area of the top-layer hollowed base plate L13 can be filled with the display module R03 and the key module R04; the hollowed area of the middle-layer hollowed base plate L12 and the hollowed area of the top-layer hollowed base plate L13 can be same as each other or be different from each other.

It is noted that the sum of the thickness of the bottom-layer hollowed base plate, the thickness of the middle-layer hollowed base plate L12 and the thickness of the top-layer hollowed base plate L13 is the preset total thickness.

Figure 57:
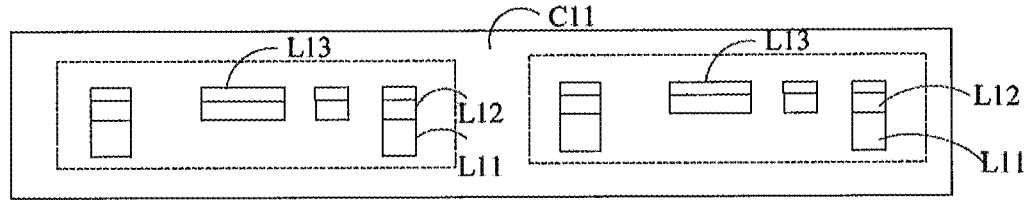
FIG. 57 shows a profile map of the synthetic hollowed base plate according to Embodiment 6 of the present invention.

Step 2302, the bottom-layer hollowed base plate, the middle-layer hollowed base plate and the top-layer hollowed base plate are synthesized to obtain the synthetic hollowed base plate; and in Embodiment 6, it can, but not limit to, take advantages of adhering and/or laminating to synthesize hollowed base plates according to the bottom-layer hollowed base plate L11, the middle-layer hollowed base plate L12 and the top-layer hollowed base plate L13, preferably, the bottom-layer hollowed base plate L11, the middle-layer hollowed base plate L12 and the top-layer hollowed base plate L13 are synthesized according to the size of hollowed areas of the bottom-layer hollowed base plate L11, the middle-layer hollowed base plate L12 and the top-layer hollowed base plate L13 so as to obtain the synthetic hollowed base plate C11 which includes the mold insert. In Embodiment 6, it provides a profile of the synthetic hollowed base plate C11, which can, but not limit to, be shown in FIG. 57.

It is noted that in Embodiment 6 the bottom-layer hollowed base plate L11, the middle-layer hollowed base plate L12 and the top-layer hollowed base plate L13 are synthesized for all at once or for multiple times (for at least two times) so as to obtain the synthetic hollowed base plate C11 which includes the mold insert.

For instance, in accordance with the size of the hollowed areas of the bottom-layer hollowed base plate L11, the middle-layer hollowed base plate L12 and the top-layer hollowed base plate L13, the bottom-layer hollowed base plate L11 is put at the bottom layer, the middle-layer hollowed base plate L12 is put at the middle layer, and the top-layer hollowed base plate is put at the top layer, in this way, the three layers of hollowed base plate are synthesized by means of screen-printing glue adhering and/or laminating to obtain the synthetic hollowed base plate C11 which includes the mold insert; or the bottom-layer hollowed base plate L11 is put at the bottom layer and the middle-layer hollowed base plate L12 is put at the top layer according to the size of the hollowed areas of the bottom-layer hollowed base plate L11, the middle-layer hollowed base plate L12 and the top-layer hollowed base plate L13, and the bottom-layer hollowed base plate L11 and the middle-layer hollowed base plate L12 are synthesized by means of screen-printing glue adhering and/or laminating to obtain the first synthetic hollowed base plate; the first synthetic hollowed base plate C11-1 is put at the bottom layer, the top-layer hollowed base plate L13 is put at the top layer, and the top-layer hollowed base plate L13 and the first synthetic hollowed base plate are synthesized by means of screen-printing glue adhering and/or laminating to obtain the synthetic hollowed base plate C11 which includes the mold insert.

It can synthesize the middle-layer hollowed base plate L12 and the top-layer hollowed base plate L13 firstly, and then synthetic the bottom-layer hollowed base plate L11.

There are other methods for synthesizing the bottom-layer hollowed base plate L11, the middle-layer hollowed base plate L12 and the top-layer hollowed base plate L13 to obtain the synthetic hollowed base plate, more details will not be given herein in Embodiment 6.

Step 2303, the mold insert is filled into the synthetic hollowed base plate.

Figure 58:
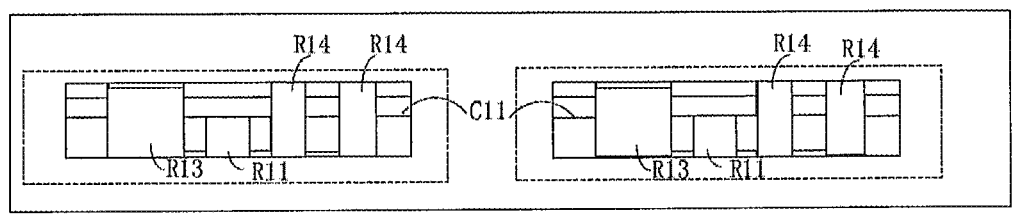
FIG. 58 shows a profile map of the synthetic hollowed base plate which includes a mold insert according to Embodiment 6 of the present invention.

In Embodiment 6, it can, but not limit to, take advantages of adhering and/or laminating technique to fill the mold insert into the synthetic hollowed base plate C11 to obtain the synthetic hollowed base plate C11 which includes the mold insert. In Embodiment 6, it provides a profile of synthetic hollowed base plate C11 which includes the mold insert, which can but not limit to be shown in FIG. 58.

Step 2304, the synthetic hollowed base plate is coated on a binding agent to obtain the smart card;

The binding agent is coated by an auto-coating device, such as the auto dispenser, on the surface of the base plate which includes the mold insert in a strip shape evenly and equal interval; and the binding agent is smoothed by means of a roller.

It is noted that after Step 303, the binding agent can be filled into the gap between the mold insert and the synthetic hollowed base plate to ensure the synthetic hollowed base plate adhere with the mold insert closely.

In Embodiment 6, after binding agent is coated on the synthetic hollowed base plate, the method further includes coating the covering layer on the synthetic hollowed base plate.

In Embodiment 6, the slice-shaped synthetic resin material applies to the covering layer which is coated on the surface of the synthetic hollowed base plate C11 including the mold insert, and the material can at least be one sort of PVC, PC, PETG, PET and ABS PVC resin.

In Embodiment 6, it provides a covering layer of a smart card, which includes a first printed design layer, a first printing material layer and a first printing-protected layer; the first printing material layer is between the synthetic hollowed base plate and the first printed design layer, and the first printed design layer is between the first printing material layer and the first printing-protected layer. The covering layer further includes a lamination, which is between the synthetic hollowed base plate and the first printing material layer.

In the case that the covering layer specifically includes the first printed design layer, the first printing material layer and the first printing-protected layer, the first printing material layer is between the synthetic hollowed base plate and the first printed design layer, and the first printed design layer is located between the first printing material layer and the first printing-protected layer.

In the case that the covering layer includes a lamination, the first printed design layer, the first printing material layer and the first printing-protected layer, the lamination is between the synthetic hollowed base plate and the first printing material layer, the first printing material layer is between the lamination and the first printed design layer, and the first printed design layer is located between the first printing material and the first printing-protected layer.

In Embodiment 6, it further provides another covering layer, which includes a second printed design layer and a second printing material layer, and the second material layer is transparent. The slice-shaped synthetic resin material applies to the second printing material layer, and the raw material can be at least one sort of PVC, PC, PETG, PET and ABS PVC resin.

In the case that the covering layer specifically includes the second printed design layer and the second printing material layer, the second printed design layer is located between the second printing material layer and the synthetic hollowed base plate.

In the case that the covering layer specifically includes the lamination, the second printed design layer and the second printing material layer, the lamination is located between the synthetic hollowed base plate and the second printed design layer, and the second printed design layer is located between the second printing material layer and the lamination.

The lamination coated on the surface of the synthetic hollowed base plate C11 which includes the mold insert is plastic film in the case that the covering layer further includes the lamination, the slice-shaped material made of synthetic resin applies to the lamination, and the material can be at least one sort of PVC, PC, PETG, PET and ABS PVC resin. A roller is used during the process of coating the lamination to make sure that the lamination can contact the base plate which includes a mold insert gradually so as to avoid from producing bubbles when the lamination is coated. The area of the coated lamination which corresponds to the display module R13 and the key module R14 is transparent in order to make the card holder can enter key and check the displayed information.

In Embodiment 6, the first printed design layer is a layer which has a pattern on it, the first printing material layer is configured to print the pattern on it, the first printing-protected layer is configured to protect the first printed design layer, the first printing material layer can be transparent or non-transparent, and the first printing-protect layer can be all transparent, or a part thereof which contacts with the printed design is transparent.

In Embodiment 6, the second printed design layer is a layer which has a printed pattern on it, the second printing material is configured to print the pattern on it, the second printing material layer can be all transparent, or a part thereof which contacts with the printed pattern of the second printed design layer is transparent.

In Embodiment 6, the printed pattern is printed on the second printing material layer by means of reprint printing to obtain the covering layer which includes the second printed design layer and the second printing material layer.

In Embodiment 6, before Step 2304, the method further includes: coating lamination on the top-layer hollowed base plate.

The production process of the present invention can be combined with multiple sorts of electronic component which is with a power supply or without a power supply, includes a smart card chip, a RFID chip and antenna, a fingerprint-identified sensor, a resistance-capacitance, a crystal oscillator and chip, etc.

While preferred Embodiments of the present invention have been shown and described herein, it will be obvious that such Embodiments are provided by way of examples only. Numerous variations or changes will occur to those skilled in the art without departing from the invention. It is intended that the following claims define the scope of protection of the invention, and that the method and structures within the scope of protection of the claims and their equivalents be covered thereby.

The invention claimed is:

1. A smart card, wherein said smart card comprises a synthetic hollowed base plate and a covering layer which is provided to coat on the synthetic hollowed base plate; the synthetic hollowed base plate contains a mold insert; and the synthetic hollowed base plate comprises multiple layers of hollowed base plate, in which a binding agent is filled into an interspace between the mold insert and the synthetic hollowed base plate, the covering layer comprises a first printed design layer, a first printing material layer and a first printing-protected layer; the first printing material is located between the synthetic hollowed base plate and the first printed design layer, the first printed design layer is located between the first printing material layer and the first printing-protected layer; the covering layer further comprises a lamination film; and the lamination film is located between the synthetic hollowed base plate and the first printing layer.

2. The smart card as claimed in claim 1, wherein the multiple layers of hollowed base plate are three layers of hollowed base plate, and the three layers of hollowed base plate comprises a bottom-layer hollowed base plate, a middle-layer hollowed base plate and a top-layer hollowed base plate.

3. The smart card as claimed in claim 1, wherein the mold insert comprises an interactive circuit module and a non-interactive circuit module.

4. The smart card as claimed in claim 3, wherein a height of the interactive circuit module is higher than that of the non-interactive circuit module; the interactive circuit module is at least located in a hollowed area of a top-layer hollowed base plate in the multiple layers of hollowed base plate; and the non-interactive circuit module is at least located in a hollowed area of one layer of a middle-layer hollowed base plate in the multiple layers of hollowed base plate.

5. The smart card as claimed in claim 4, wherein the interactive circuit module comprises a key module and a display module; the non-interactive circuit module comprises a power supply module and a control module;

a height of the key module or a height of the display module is higher than a height of the power supply module or a height of the control module;

the key module is located in a hollowed area of the multiple layers of hollowed base plate; the display module is located in the hollowed area of the multiple layers of hollowed base plate; the power supply module is at least located in a hollowed area of a bottom-layer hollowed base plate in the multiple layers of hollowed base plate; and the control module is at least located in a hollowed area of the bottom-layer hollowed base plate in the multiple layers of hollowed base plate.

6. The smart card as claimed in claim 5, wherein the height of the power supply module is different from the height of the control module;

the power supply module is at least located in one layer of the middle-layer hollowed base plate in the multiple layers of hollowed base plate in the case that the height of the power supply module is higher than the height of the control module; or the control module is at least located in a hollowed area of one layer of hollowed base plate of the middle-layer hollowed base plate in the multiple layers of hollowed base plate in the case that the height of the control module is higher than the height of the power supply module.

7. The smart card as claimed in claim 1, wherein the covering layer comprises a second printed design layer and a second printing material layer; the second printed design layer is located between the second printing material layer and the synthetic hollowed base plate; the second printing material layer is transparent; the covering layer further comprises the lamination film, and the lamination film is located between the synthetic hollowed base plate and the second printed design layer.

8. A method for making a smart card, wherein said method comprises the following steps:
   s1) hollowing out each of multiple base plates to obtain multiple hollowed base plates;
   s2) synthesizing the multiple hollowed base plates to obtain a synthetic hollowed base plate;
   s3) filling a gradually shaped mold insert into the synthetic hollowed base plate; and
   s4) coating a binding agent on the synthetic hollowed base plate to obtain the smart card,
   a roller is used during the step s4) to make sure that the binding agent contacts the synthetic hollowed base plate which includes the gradually shaped mold insert or a tapered mold insert to avoid from producing bubbles when the binding agent is coated, in which the binding agent is filled into an interspace between the tapered mold insert and the synthetic hollowed base plate,
   before Step s4), the method further comprises coating a lamination film on a top-layer hollowed base plate of the multiple hollowed base plates;
   after coating the binding agent on the synthetic hollowed base plate, the method further comprises coating a covering layer on the synthetic hollowed base plate;
   the covering layer comprises a first printed design layer, a first printing material layer and a first printing-protected layer; the first printing material layer is located between the synthetic hollowed base plate and the first printed design layer, the first printed design layer is located between the first printing material layer and the first printing-protected layer; and the covering layer further comprises a lamination film, which is located between the synthetic hollowed base plate and the first printing material layer.

9. The method as claimed in claim 8, wherein the multiple base plates include three base plates comprising a first base plate, a second base plate and a third base plate; the first base plate, the second base plate and the third base plate are hollowed out respectively, so as to obtain a bottom-layer hollowed base plate, the middle-layer hollowed base plate and the top-layer hollowed base plate.

10. The method as claimed in claim 8, wherein Step s1) specifically comprises hollowing out the multiple base plates respectively by means of punching, die cutting or milling technique to obtain the multiple hollowed base plates.

11. The method as claimed in claim 8, wherein Step s1) specifically comprises hollowing out the multiple base plates respectively according to multiple preset hollowed areas so as to obtain the multiple hollowed base plates.

12. The method as claimed in claim 8, wherein Step s1) specifically comprises hollowing out the multiple base plates according to multiple preset hollowed areas and multiple preset thicknesses so as to obtain the multiple hollowed base plates.

13. The method as claimed in claim 8, wherein Step s2) specifically comprises synthesizing the multiple hollowed base plates by means of adhering and/or laminating technique so as to obtain the synthetic hollowed base plate which includes the gradually shaped mold insert or a tapered mold insert.

14. The method as claimed in claim 8, wherein synthesizing the multiple hollowed base plates so as to obtain the synthetic hollowed base plate specifically comprises: synthesizing the multiple hollowed base plates for all at once or for multiple times so as to obtain the synthetic hollowed base plate.

15. The method as claimed in claim 8, wherein Step s3) specifically comprises filling the gradually shaped mold insert or a tapered mold insert into the synthetic hollowed base plate by means of adhering and/or laminating technique.

16. The method as claimed in claim 8, wherein the covering layer comprises a second printed design layer and a second printing material layer, the second printing material is transparent; the second printed design layer is located between the second printing material layer and the synthetic hollowed base plate; and the covering layer further comprises a lamination film, which is located between the synthetic hollowed base plate and the second printed design layer.

17. The method as claimed in claim 8, wherein the gradually shaped mold insert or a tapered mold insert comprises an interactive circuit module.

* * * * *